(12) United States Patent
Kojima et al.

(10) Patent No.: US 9,391,705 B2
(45) Date of Patent: Jul. 12, 2016

(54) NON-CONTACT CONNECTOR

(71) Applicant: CHUBU NIHON MARUKO CO., LTD., Komaki-shi, Aichi (JP)

(72) Inventors: Tetsuya Kojima, Kagamihara (JP); Hiroyuki Koitabashi, Komaki (JP)

(73) Assignee: CHUBU NIHON MARUKO CO., LTD., Komaki-shi, Aichi (JP)

( * ) Notice: Subject to any disclaimer, the term of this patent is extended or adjusted under 35 U.S.C. 154(b) by 30 days.

(21) Appl. No.: 14/126,892

(22) PCT Filed: Feb. 27, 2013

(86) PCT No.: PCT/JP2013/055183
§ 371 (c)(1),
(2) Date: Dec. 17, 2013

(87) PCT Pub. No.: WO2014/030366
PCT Pub. Date: Feb. 27, 2014

(65) Prior Publication Data
US 2015/0222362 A1 Aug. 6, 2015

(30) Foreign Application Priority Data
Aug. 24, 2012 (JP) ................. 2012-185911

(51) Int. Cl.
*H04B 10/00* (2013.01)
*H04B 10/40* (2013.01)
*H04B 10/80* (2013.01)
*G02B 6/35* (2006.01)
*G02B 6/36* (2006.01)

(52) U.S. Cl.
CPC .............. *H04B 10/40* (2013.01); *G02B 6/3504* (2013.01); *G02B 6/3604* (2013.01); *H04B 10/801* (2013.01)

(58) Field of Classification Search
CPC ..... H04B 10/22; H04B 10/2503; H04B 10/40
See application file for complete search history.

(56) References Cited

U.S. PATENT DOCUMENTS

2002/0132589 A1* 9/2002 Kojima et al. ................. 455/73
2009/0136175 A1* 5/2009 Koitabashi ..................... 385/18
2010/0040378 A1* 2/2010 Koitabashi .................... 398/141

FOREIGN PATENT DOCUMENTS

| JP | 63-085508 A | 4/1988 |
| JP | 07-030489 A | 1/1995 |
| JP | 2002-075760 A | 3/2002 |
| JP | 2006-246085 A | 9/2006 |
| JP | 2009-130773 A | 6/2009 |

* cited by examiner

*Primary Examiner* — Dzung Tran
(74) *Attorney, Agent, or Firm* — Muncy, Geissler, Olds & Lowe, P.C.

(57) ABSTRACT

A non-contact connector is the solving means that a plurality of new light sources discretely distributed over a circumferential direction are generated from one light source on a rotator, and the lining is performed as the new light source with the characteristic which are not in an original light source. At the time of rotation of the light source, at least one in two or more new light sources maintain connection with an external output terminal and switch the remaining new light sources, so an always-on connection state is secured and the hit of the time-axis of the line signal at the time of an optical path change is avoided.

9 Claims, 18 Drawing Sheets $\theta = 30°$ $\theta = 60°$ $\theta = 90°$

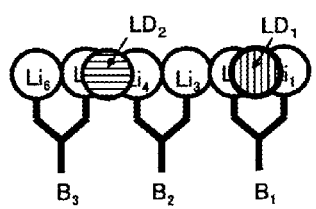
$\theta = 30°$  $\theta = 60°$  $\theta = 90°$

FIG.5

Expressed as P1=1, P2=1

| θ | $A_6$ | $A_5$ | $A_4$ | $A_3$ | $A_2$ | $A_1$ | $A_6$ | $A_5$ | $A_4$ | $A_3$ | $A_2$ | $A_1$ |
|---|---|---|---|---|---|---|---|---|---|---|---|---|
| 0° | | | | | | | 0 | 1/2 | 1/2 | 0 | 1/2 | 1/2 |
| 30° | | | | | | | 1/4 | 1/2 | 1/4 | 1/4 | 1/2 | 1/4 |
| 60° | | | | | | 0 | 1/2 | 1/2 | 0 | 1/2 | 1/2 | 0 |
| 90° | | | | | | 1/4 | 1/2 | 1/4 | 1/4 | 1/2 | 1/4 | |
| 120° | | | | | 0 | 1/2 | 1/2 | 0 | 1/2 | 1/2 | 0 | |
| 150° | | | | | 1/4 | 1/2 | 1/4 | 1/4 | 1/2 | 1/4 | | |
| 180° | | | | 0 | 1/2 | 1/2 | 0 | 1/2 | 1/2 | 0 | | |
| 210° | | | | 1/4 | 1/2 | 1/4 | 1/4 | 1/2 | 1/4 | | | |
| 240° | | | 0 | 1/2 | 1/2 | 0 | 1/2 | 1/2 | 0 | | | |
| 270° | | | 1/4 | 1/2 | 1/4 | 1/4 | 1/2 | 1/4 | | | | |
| 300° | | 0 | 1/2 | 1/2 | 0 | 1/2 | 1/2 | 0 | | | | |
| 330° | | 1/4 | 1/2 | 1/4 | 1/4 | 1/2 | 1/4 | | | | | |
| 360° | | 1/2 | 1/2 | 0 | 1/2 | 1/2 | 0 | | | | | |

FIG.6
Expressed as P1=1, P2=1
| θ (°) | Li6 | Li5 | Li4 | Li3 | Li2 | Li1 | Li6 | Li5 | Li4 | Li3 | Li2 | Li1 |
|---|---|---|---|---|---|---|---|---|---|---|---|---|
| | B3 | | B2 | | B1 | | B3 | | B2 | | B1 | |
| 0 | | | | | | | 0 | 0 | 1 | 0 | 0 | 1 |
| 30 | | | | | | | 0 | 1/2 | 1/2 | 0 | 1/2 | 1/2 |
| 60 | | | | | | 0 | 0 | 1 | 0 | 0 | 1 | 0 |
| 90 | | | | | | 0 | 1/2 | 1/2 | 0 | 1/2 | 1/2 | |
| 120 | | | | | 0 | 0 | 1 | 0 | 0 | 1 | 0 | |
| 150 | | | | | 0 | 1/2 | 1/2 | 0 | 1/2 | 1/2 | | |
| 180 | | | | 0 | 0 | 1 | 0 | 0 | 1 | 0 | | |
| 210 | | | | 0 | 1/2 | 1/2 | 0 | 1/2 | 1/2 | | | |
| 240 | | | 0 | 0 | 1 | 0 | 0 | 1 | 0 | | | |
| 270 | | | 0 | 1/2 | 1/2 | 0 | 1/2 | 1/2 | | | | |
| 300 | | 0 | 0 | 1 | 0 | 0 | 1 | 0 | | | | |
| 330 | | 0 | 1/2 | 1/2 | 0 | 1/2 | 1/2 | | | | | |
| 360 | | 0 | 1 | 0 | 0 | 1 | 0 | | | | | |
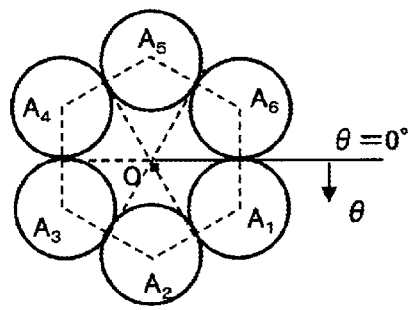
FIG. 7(1)
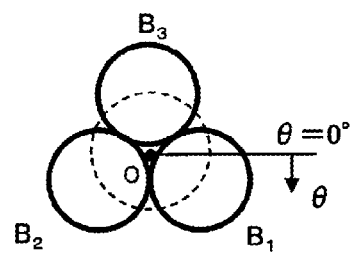
FIG. 7(2)

FIG. 10(1)
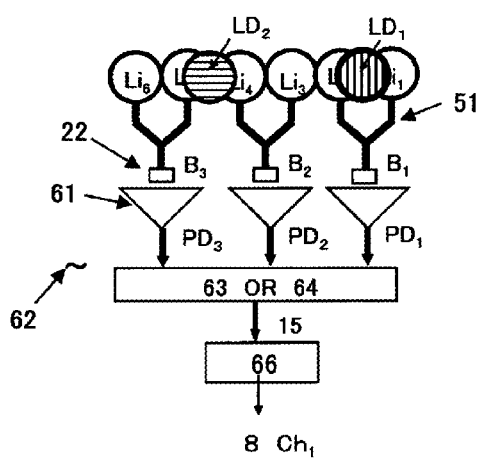
FIG. 10(2)
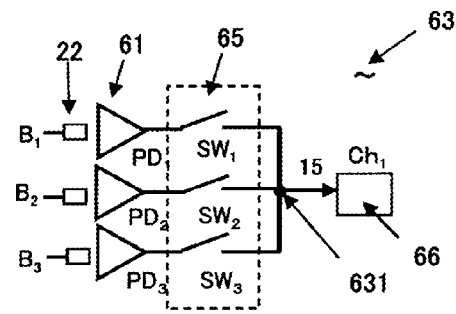
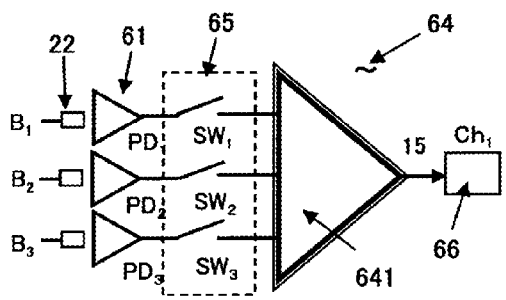
FIG. 10(3)
| Circuit system (Line system) (60) | Electrical circuit system(62) | MBB type switch circuit(63) | Electrical switch(65) |
| | | | Conductive circuit(631) |
| | | MBB type adder circuit(64) | Electrical switch(65) |
| | | | Adder circuit(641) |
| | Optical circuit system(72) | MBB type optical circuit(67) | Optical switch(75) |
| | | | Optical fiber coupler(51) |

FIG.11

| θ (°) | Ch₂ | Ch₁ |
|---|---|---|
| $0 \leq \theta \leq 60$ | $B_3+B_2$ | $B_1$ |
| $60 \leq \theta \leq 120$ | $B_3$ | $B_2+B_1$ |
| $120 \leq \theta \leq 180$ | $B_1+B_3$ | $B_2$ |
| $180 \leq \theta \leq 240$ | $B_1$ | $B_3+B_2$ |
| $240 \leq \theta \leq 300$ | $B_2+B_1$ | $B_3$ |
| $300 \leq \theta \leq 360$ | $B_2$ | $B_1+B_3$ |

FIG.14

| $\theta(°)$ | $B_3$ | $B_2$ | $B_1$ |
|---|---|---|---|
| $330 \leq \theta \leq 30$ | 0 | $Ch_2$ | $Ch_1$ |
| $\theta = 30$ | $Ch_2$ | $Ch_2$ | $Ch_1$ |
| $30 \leq \theta \leq 90$ | $Ch_2$ | 0 | $Ch_1$ |
| $\theta = 90$ | $Ch_2$ | $Ch_1$ | $Ch_1$ |
| $90 \leq \theta \leq 150$ | $Ch_2$ | $Ch_1$ | 0 |
| $150 \leq \theta \leq 210$ | 0 | $Ch_1$ | $Ch_2$ |
| $210 \leq \theta \leq 270$ | $Ch_1$ | 0 | $Ch_2$ |
| $270 \leq \theta \leq 330$ | $Ch_1$ | $Ch_2$ | 0 |

$\theta = 30°$  $\theta = 45°$  $\theta = 60°$

| $B_1 \sim B_6$ ;31 | $Ch_1 \sim Ch_4$ ;33 |

FIG.16

| θ(°) | B6 | B5 | B4 | B3 | B2 | B1 |
|---|---|---|---|---|---|---|
| θ=0 | Ch$_4$ | Ch$_4$ | Ch$_3$ | Ch$_2$ | Ch$_2$ | Ch$_1$ |
| 0<θ<30 | Ch$_4$ | 0 | Ch$_3$ | Ch$_2$ | 0 | Ch$_1$ |
| θ=30 | Ch$_4$ | Ch$_3$ | Ch$_3$ | Ch$_2$ | Ch$_1$ | Ch$_1$ |
| 30<θ<60 | Ch$_4$ | Ch$_3$ | 0 | Ch$_2$ | Ch$_1$ | 0 |
| θ=60 | Ch$_4$ | Ch$_3$ | Ch$_2$ | Ch$_2$ | Ch$_1$ | Ch$_4$ |
| 60<θ<90 | 0 | Ch$_3$ | Ch$_2$ | 0 | Ch$_1$ | Ch$_4$ |
| θ=90 | Ch$_3$ | Ch$_3$ | Ch$_2$ | Ch$_1$ | Ch$_1$ | Ch$_4$ |
| 90<θ<120 | Ch$_3$ | 0 | Ch$_2$ | Ch$_1$ | 0 | Ch$_4$ |
| 120<θ<150 | Ch$_3$ | Ch$_2$ | 0 | Ch$_1$ | Ch$_4$ | 0 |
| 150<θ<180 | 0 | Ch$_2$ | Ch$_1$ | 0 | Ch$_4$ | Ch$_3$ |
| 180<θ<210 | Ch$_2$ | 0 | Ch$_1$ | Ch$_4$ | 0 | Ch$_3$ |
| 210<θ<240 | Ch$_2$ | Ch$_1$ | 0 | Ch$_4$ | Ch$_3$ | 0 |
| 240<θ<270 | 0 | Ch$_1$ | Ch$_4$ | 0 | Ch$_3$ | Ch$_2$ |
| 270<θ<300 | Ch$_1$ | 0 | Ch$_4$ | Ch$_3$ | 0 | Ch$_2$ |
| 300<θ<330 | Ch$_1$ | Ch$_4$ | 0 | Ch$_3$ | Ch$_2$ | 0 |
| 330<θ<360 | 0 | Ch$_4$ | Ch$_3$ | 0 | Ch$_2$ | Ch$_1$ |

FIG.17

| N | 3 | 4 | 5 | | 6 | |
|---|---|---|---|---|---|---|
| m | 1 | 2 | 2 | | 2 | |
| Relative position | Just above | Outside of just above | Entire range | Just above | Outside of just above | Just above | Outside of just above |
| m$_1$ | 0 | 1 | 0 | 0 | 1 | 0 | 2 |
| m$_2$ | 1 | 0 | 2 | 2 | 1 | 2 | 0 |
| n | 2 | 2 | 3 | | 4 | |

NON-CONTACT CONNECTOR

TECHNICAL FIELD

The present invention relates to a non-contact connector which performs a data transmission and reception by non-contact.

In detail, it is related with an optical communication circuit performed by constituting a light path in a space between a rotator and a stator.

BACKGROUND ART

As a communication between the rotating side and the fixed side, that is, an optical communication under a rotation environment, for example, for the demand which transmits a video signal etc. from the video camera attached to the rotating side to the fixed side, there were a method of carrying out wiring directly and carrying out the circuit of the electric signal and a method of carrying out circuiting directly by the circuit equipment of the contact system called a slip ring, etc. Then, by the progress of the infrared-ray-communication art, a data transmission and reception by a non-contact optical communication type can be performed. Among this, there are the circuit system which is formed by opposed image conduit (image conductive pipe) structures consist of thousands of bundled image fibers, and a light image signal is propagated in the space of those conduit structures, or the circuit system (or line system) in which the light path in the space between the light source emit communication light and the light-receiving device is configured and a data transmission and reception are performed. In the non-contact electric power supply from the fixed side to the rotating side, a rotary transformer is used in many cases, and it is sought for the minimization of the occupancy space of the equipment for an electric power and an optical path constitution installed in a countering space between the fixed side and the rotating side.

[Patent reference 1] Japanese Unexamined Patent Publication Tokkai2002-75760

In Japanese Unexamined Patent Application Publication No. 2002-75760, for the "switch system" which switches a photo detector output directly and performs a line formation, since it is need to switch the time-axis of a circuit signal, the circuit signal of about tens of Mbps is restricted. Therefore, equipment which has a high speed like a Hi-Vision picture and lines the circuit signal of huge data volume bi-directionally simultaneously with a simple structure without a mechanical element is desired.

The present invention was made for such the subject, and an object of the present invention is to realize the non-contact connector which lines the data signal of multi channels bi-directionally simultaneously with a simple structure, while reducing the required photonic devices in addition to the subject of the high speed which the "switch system" has.

Means to Solve the Problems

In order to solve the above-mentioned subject, a means which the present invention proposes is described below. In order to solve the subject, the Claim 1 of present invention is a non-contact connector, comprising: a housing; a stator fixed and stored in the housing; a rotator contained in the housing and rotating around a rotation axis of the stator; a light output device arranged on a vertical plane to the rotation axis of the rotator; a light-receiving device arranged on the stator facing the light output device, and a non-contact circuiting is performed by forming a light path in a space between the light output device and the light-receiving device, wherein outputs of a light source driven with a supplied power on the rotator are emitted from the light output device in parallel with the rotation axis corresponding to the circuit signals to communicate, and the light-receiving device receives the outputs, and the outputs are combined and captured by an optical coupling unit connected to the light-receiving device, and a new light source is formed, and the light source is composed (restored) on an external output terminal from the new light source to the non-contact circuiting (to the non-contact lining). By this means, for example, by building an optical communication circuit system (the new light source circuit system) for the new light source which is generated by an optical coupling unit on an stator from an light source on an rotator, the circuiting (or lining) which are multi channels and has simultaneous and bidirectional performance can be realized.

In order to solve the subject, Claim 2 of the present invention is the non-contact connector, wherein the light-receiving devices are arranged so as to capture the light source on a circle centered on the rotation axis, and a new light source is formed on the stator by combining output lights of the light-receiving devices with a use of optical coupling units to the non-contact circuiting. By this means, for example, a new light source of a light signal is generated on the stator by changing a light source on a rotator into a new light source which has the characteristic widely distributed over a circumferential direction using the optical coupling unit.

In order to solve the subject, Claim 3 of the present invention is the non-contact connector, wherein after choosing a light source before switching among the new light source, a captured light source is formed by combining the light source before switching and a light source to be switched, and switching of light sources between the light source before switching and a light source to be switched is performed to compose the light source on an external output terminal. By this means, for example, a light source can be composed on an external output terminal by performing a capture switching and a light source catch to a new light source, without making a time-axis of a circuit signal generate a hit.

DISCLOSURE OF THE INVENTION

Problems to be Solved by the Invention

In order to solve the subject, Claim 4 of the this present is the non-contact connector, wherein the optical coupling units and the new light-receiving devices facing a luminescence part each of the optical coupling units are arranged with an equally distance on the circumference around the rotation axis of the stator, and a light source in a particular channel is composed by capturing a light source from the chosen new light source on the rotator side by the optical coupling units to the non-contact circuiting. By this means, for example, for an new light source, a circuit system which restore an light source of a specific channel on an rotator, that is an optical circuit of an restoration system on rotator can be constituted.

In order to solve the subject, Claim 5 of the present invention is the non-contact connector, wherein the new light source of light signals capturing the light source is composed on the stator by light-receiving elements for communication, and circuited as electric signals. By this means, for example, for a new light source, a circuit system which composes a light source, that is, an electric circuit by the circuit system can be constituted by performing a capture switching and a light source catch on a stator using an electrical switch.

In order to solve the subject, Claim 6 of the present invention is the non-contact connector, wherein an optical system switch or an optical switch is applied to the output of the optical coupling units correspond to the N (N=integer) light-receiving devices arranged on a circumference around the rotation axis, and the light path in a space is formed and an optical circuit system is provided. By this means, for example, for a new light source, a circuit system which composes a light source, that is, an optical circuit by the circuit system can be constituted by performing a capture switching and a light source catch on a stator using an electrical switch.

In order to solve the subject, Claim 7 of the present invention is the non-contact connector according to any one of claims 1 to 3 and 5, wherein optical circuit signals of N channels which are output from the N light-receiving devices and are input to light-receiving devices provided so as to face the light-receiving devices on the rotator are converted to electric signals, and a circuit system with the maximum of n is formed. By this means, for example, a circuit system which considers a new light source to be "a new light source in a fixed side" can be constituted, and the constitution contrary to the circuit system through the new light source can be realized. In this circuit system, a channel switch will be carried out in the luminescence side.

In order to solve the subject, Claim 8 of the present invention is the non-contact connector according to any one of claims 1 to 3, wherein after forming the new light source of the electric signals by light-receiving elements for communication from outputs of the light-receiving devices, the light source is composed on the stator and circuited as electric signals. By this means, for example, a new light source of an electric signal output can be obtained without applying to an optical coupling unit. Positioning of this restoration system is replaced with a new light source of a light signal output of Claim 2, and is at a point of obtaining a new light source of an electric signal output.

In order to solve the subject, Claim 9 of the present invention is the non-contact connector, wherein the light output devices and the light-receiving devices are comprised of optical semiconductor elements which have both a luminescence function and a light-receiving function, and the light output devices and the light-receiving devices are arranged to be mixed so as to capture the light source, and the light path in a space in both directions between the stator and the rotator is formed, and a two-way communication capability and simultaneous communication performance are obtained. By this means, for example, a simultaneous bidirectional circuit system of multi channels can be constituted by using the light output device and the light-receiving device with a bi-direction character of a luminescence function and a light-receiving function.

Effect of the Invention

An effect of a non-contact connector which constituted a circuit system using a new light source is described.

1. Simultaneous Bidirectional-Communication Character at Multi-Channels

It is possible to carry out a circuiting of the high-speed data signal bi-directionally simultaneously in the multi-channels.

An arbitrary combination of an optical circuit and an electric can be carried out.

2. Cost

In an optical circuitcircuit system or a switch system of a luminescence side system, since a required number of an expensive photo detector turns into only a channel number, it can be consider as a minimum quantity and can cut down the cost.

3. Deployment Characteristic

The present non-contact connector has a deployment characteristic to the other field equipment, such as a blind-mating type connector (a connector which can be detachable under un-viewing) by changing into a structure which can be inserted and removed.

DRAWING_DESCRIPTION

Brief Description of Drawings

FIG. 5 is an output characteristic of a continuous type new light source (two channels).

FIG. 6 is an output characteristic of a discrete type new light source (two channels).

FIGS. 7(1) and 7(2) are output characteristics in a new light source space of a new light source.

FIGS. 10(1) to 10(3) are configuration examples of a restoration system on a stator of an electric circuit.

FIG. 11 is a channel switch table of a discrete type new light source (two channels).

FIG. 14 is a channel switch table of a reverse circuit system (two channels).

FIG. 16 is a channel switch table of a reverse circuit system (four channels).

FIG. 17 is the example of a maximum channel number of a reverse circuit system.

DETAILED_DESCRIPTION

Description of Embodiment(s)

Figure 1:
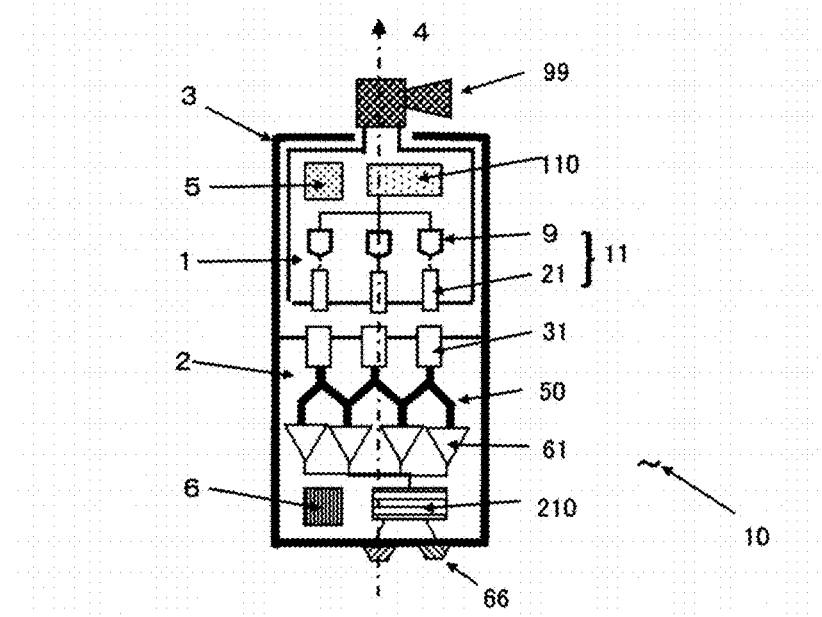
FIG. 1 is an overall structure figure of a non-contact connector.

Hereinafter, the best embodiment for carrying out the present invention is explained, referring to drawings.

Structure and Function

By constituting a communication system having an space optical transmission from an light source (11) on a rotator (1) which emits light corresponding to the circuit signal (7) towards an light-receiving device (31) on a stator (2), this non-contact connector (10) is an circuit equipment which forms a circuit from the rotator (1) to the stator (2).

FIG. 1 shows an example of the non-contact connector (10) to which the present invention is applied.

FIG. 1 shows the sectional view in a plane including a rotation axis (4).

The non-contact connector (10) is a structure in which the rotator (1) and the stator (2) are the counter installation, as shown in a drawing, and are stored in a housing (3), the stator (2) is fixed to the housing (3), and the rotator (1) rotates centering on the rotation axis (4) to the stator (2).

The rotator (1) comprises a rotating-side power source (5), a rotating-side electric circuit portion (110), a light emitting element (9), and a light output device (21).

The light output device (21) is installed in the position which counters the stator (2), and the light emitting element (9) is installed in the position where the light emitting element (9) is installed so that the light emitting element (9) pairs with the light output device.

On the other hand, the rotating-side electric circuit portion (110) does not need to be in the position which counters the stator (2).

The rotating-side electric circuit portion (110) mainly comprises an electronic circuit, and has the signal processing function of the circuit signal (7) and the power supply function into the signal processing part of the circuit signal (7).

For example, when the video camera for an image pick-up (99) is mounted in the rotator (1), the rotating-side electric circuit portion (110) which is driven by the rotating-side power source (5) performs the signal processing for the video signal etc. of the video camera input to make the light emitting element (9) emit the light.

At this time, the light source (11) is a luminous body installed on the rotator (1), the light source may be the light source (11) of the embodiment that the output light from light emitting element (9), such as a laser diode (Laser Diode, in the following, it is abbreviated to LD), is directly input to the light output device (21), then the light is emitted from the light output device (21), and also the light source may be the light source (11) of the embodiment that once the LD light is taken into the optical fiber, the light output device (21) is connected and the output light is emitted from the light output device (21).

Therefore, in the drawing, the light source is drawn as the light source which comprises the light emitting element and the light output device.

The light output device (21) is installed on a plane rightangled to the rotation axis (4) of the rotator (1), while the optical formation to the output light from the light source (11) is performed by the optical system of the collimator etc. which the light output device (21) contains, the light output device (21) has a function which sends out the data signal which the circuit signal (7) has towards the light-receiving device (31) of the fixed side via the light path in the space.

However, when there is no necessity for the optical formation corresponding to the embodiment of the light source (11), the light output device (21) may be an embodiment without the optical system.

When the rotating-side power source (5) is divided roughly, there are a system which does not always receive an electric supply from a fixed-side power source (6) like an rechargeable battery and a system in which an electric supply is always supplied from the fixed-side power source (6) in the stator (2) side.

Further in a power feeding method from the fixed-side power source (6), one is a rotary transformer (120) or an optical power generation etc. as a non-contact feeding method, other is a slip ring etc. as a contact feeding method.

Although any source system of the electric power can be made into the rotating-side power source (5) at this time, since the installed position and the structure are related to the limitations of each system, it is necessary to make them into the position and the structure correspond to each.

The drawing has shown the case of a rechargeable battery in the above-mentioned power supply.

Next, the stator (2) is explained.

The stator (2) comprises the light-receiving device (31), an optical coupling unit (50), a communication light-receiving element (61), a fixed side electric circuit part (210), an external output terminal (66), and the fixed-side power source (6).

Now the circuit signal (7) of the light signal transmitted through the light path in the space on the stator (2) is input into the light-receiving device (31), and leads to the optical coupling unit (50) and receives a joint operation, when the circuiting is carried out as a light signal (optical circuit) by a light signal, when the circuiting is carried out as the electric signal (electric circuit), after being changed into the electric signal by the communication light-receiving element (61), it is input into the fixed side electric circuit part (210), and the processing of the channel switch etc. between circuit signals, etc. is made, and it is connected to the external output terminal (66).

The circuit signal (7) is outputted as an external output signal (8) of the non-contact connector (10) by the connecting operation, and the circuit system is constituted.

First, on the plane of the stator (2) perpendicular to the rotation axis (4), the light-receiving device (31) counters the rotator (1), and is installed, it has a condensing function and an optical formation function, such as a collimation to the incident light, and the output is connected to the optical coupling unit (50).

At this time, the optical coupling unit (50) which treats the output light from the light-receiving device (31) as an input has the characteristic which give only the flow of the one-way light signal from the input light side to the output light side which a common optical coupler (501) has at the time of an optical communications, and has the branching and combining function of the input light quantity.

The present invention constitutes the optical circuit which performs the fraction operation (branching) and an addition operation (combination or composition) over the circuit signal (7) using this function.

Next, the fixed side electric circuit part (210) has a power supply function to the electrical circuit which constitutes it, and performs the switching operation of the circuit signal and the connecting operation to the external output terminal (66).

In FIG. 1, after the output of the optical coupling unit (50) is changed into the electric signal by the communication light-receiving element (61), the structure where the electric signal is input into the fixed side electric circuit part (210) is shown.

The processing of the channel switch between the input circuit signals, etc. is performed by the electric signal there, it is connected to the external output terminal (66), and the electric circuit is constituted.

On the other hand, in the case of the optical circuit, the output of the optical coupling unit (50) is directly input into the fixed side electric circuit part (210), and the optical path switch etc. are performed by the fixed side electric circuit part (210).

In any case, the output of the fixed side electric circuit part (210) is connected to the external output terminal (66), and it is outputted as the external output signal (8) of the non-contact connector (10).

And although the fixed-side power source (6) is the electric power sending-out power supply to the rotating-side power source (5) as described above, and it is a source of the electric power of the communication light-receiving element (61) and the fixed side electric circuit part (210), since a variety of the existing power supply can be used like the above, the installed position or structure is not specified and is drawn.

Request for Non-Contact Connector

Japanese Unexamined Patent Application Publication No. 2002-75760 is the circuit system of switching directly two photo detector outputs which the switching source and the switching target are receiving.

In this switch system, since the optical system of the reflecting mirror etc. was not applied to the light path in the space which faces from the light emitting element to the photo detector in addition to the subject to the high speed signal, there were restrictions that each had to be arranged on the straight line in the space that each counters.

Therefore, the demand for this non-contact connector (10) can be said that the higher signal speed can be treated, and there is no restriction for the setting position, and the circuit system can be built with the light emitting element and photo detector of the minimum number.

New Light Source Generation System

The line in the present invention means the operation process that the light source (11) is composed on the rotator (1) on the external output terminal (66) of the stator (2) and is outputted from the non-contact connector (10) as the external output signal (8).

Figure 2:
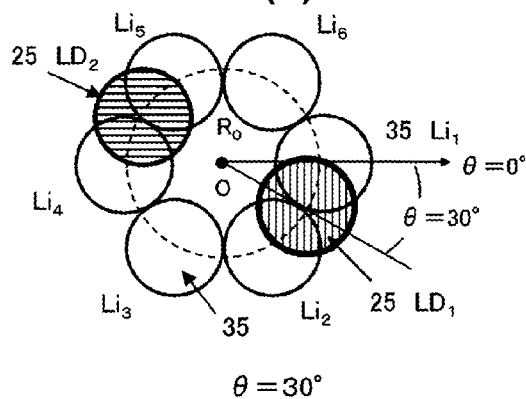
FIGS. 2(1) to 2(6) is a circuit by a space light communication.
Figure 2:
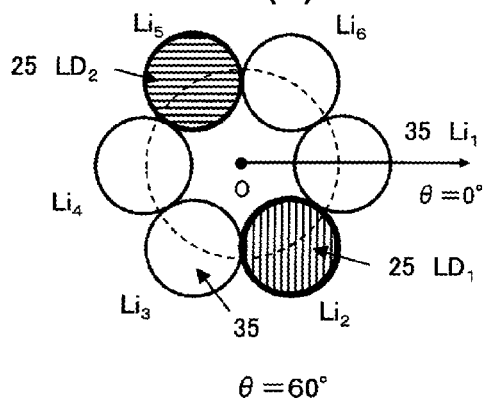
Figure 2:
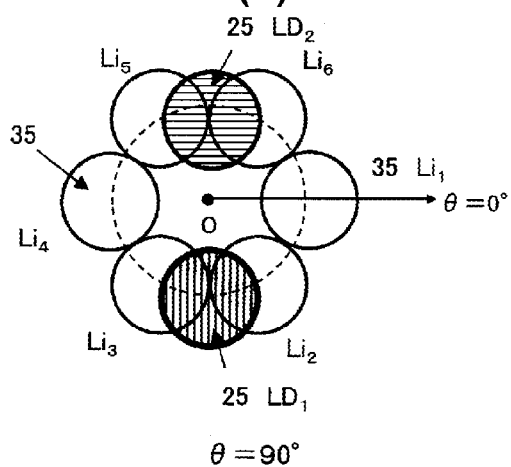
Figure 2:
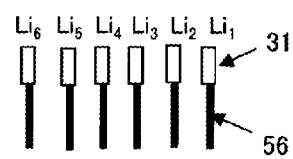
Figure 2:
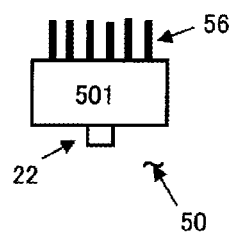
Figure 2:
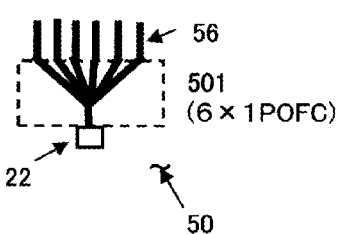

The line condition between the rotator (1) and the stator (2) by the space optical transmission is shown in FIGS. 2(1) to 2(3).

In the drawing, the six light-receiving devices (31) on the fixed bodies (2) and the two light sources (11) (two-channel systems) on the rotator (1) are installed, and the drawing shows the state where the two space light paths parallel to the rotation axis (4) are constituted.

Also, the drawing shows an attainment light source region (25) and a light-receiving possible region (35) on an acceptance surface between the rotator (1) and the stator (2), which are about right angles (inside of the surface of paper) to the rotation axis (4).

That is, the drawing shows the arrangement of the light-receiving possible region (35) and the attainment light source region (25) which are constituted by "arranging without a space" the light-receiving possible region (35) of the light-receiving device (31) on the circumference of a circle O.

That is, the output light of the light source (11) is outputted from the light output device (21), and an existence region of the light source (11) arrived at an acceptance surface of the light-receiving device (31), (hereinafter, the attainment light source region (25)) is expressed as a circular and is referred to as $LD_1$ and $LD_2$. The light-receiving possible region (35) of the light-receiving device (31) on the stator (2) is also expressed as a circular, and it is the state in which the numbers of $Li_1$ to $Li_6$ (the abbreviation of a light inlet) are attached (the attainment light source region is also called the attachment light source circle (25) by making shape of the attainment light source region into the circle, the case of the light-receiving possible circle (35) is also the same).

Then, in the drawing, the circle O show the moving track of the light source (11), and the six small circles show the light-receiving possible circle (35) arranged without a space on the circumference of the circle O, and the small circle of two striped patterns show the attainment light source region (25).

The drawing shows the geometric relation that the diameter of the attainment light source diameter≈the light-receiving possible region diameter among the conditions (discussed below) of the attainment light source diameter≤light-receiving diameter of a light-receiving device.

At this time, in FIG. 2(1), the light source $LD_1$ is located on the θ=30 degrees, and exists in division into equal parts on the both sides of $Li_1$ and $Li_2$, in FIG. 2(2) the light source $LD_1$ is located on the θ=60 degrees, and exists right above $Li_2$, and FIG. 2(3) shows the state of the θ=90 degrees.

Now the output side of the light-receiving device (31) $Li_1$-$Li_6$ are respectively connected to one optical fiber (56) (hereinafter Plastic Optical Fiber is abbreviated to POF (56)) and it is in the state which is shown in FIG. 2(4).

That is, the output of the light-receiving device changes to a POF output by the POF having the light-receiving device POF (31).

(That is, it is in the state in which POF does not exist in the above-mentioned switch system, but the outputs of $Li_1$-$Li_6$ are directly led to the light-receiving device).

Now, the optical coupling unit (50) which combines the above-mentioned POF output is explained.

First, the optical coupling unit (50) comprises a POF for an input (56), an optical coupler (501), and the new light output device (22) which is a part which takes out the output from the optical coupler (501) outside, as shown in FIG. 2(5).

Here, even if the optical coupler (501) may be a commercial optical fiber coupler (it is abbreviated to POFC from Plastic Optical Fiber Coupler hereinafter) or a waveguide way type optical coupler, it may be original structure with the function which combines a plurality of light signals.

Hereinafter, although it is not necessary to limit to the POFC, since it is easy to draw a concrete image, this optical coupling unit (50) is explained as POFC as shown in FIG. 2(6).

Now, although the POFC of 6 input 1 output is drawn in FIG. 2(6) as an example of the optical coupler (501), hereinafter, the POFC with the inputs of L pieces and the outputs of k pieces is described to be L input k output POFC or L×k POFC or similar.

Then, FIG. 2(6) will show the optical circuit which combines the six input lights with one POF, and is outputted from a new light output device (22) by connecting the output of the six POF(s) (56) to the input opening of 6×1POFC, respectively.

This time, for example, the embodiment that the six inputs of 6×1POFC are replaced with the m×1POFC or the POF in which the light can be input from its side, can be also considered.

This can be said to be an example of the configuration method of the optical circuit which responds by replacing POF with POFC for the increase requirement of the number of light-receiving devices.

In the case of L=k=1, it is described as 1×1POFC (55), but the embodiment is one POF.

Here, the new light output device (22) may have the optical system of a lens, a collimator, etc. to handle the characteristics of the communication light-receiving element (61) which receives the output from the new light output device (22).

However, the new light output device (22) itself may be unnecessary.

Next, the rotation angle θ is defined, and the positional relation of the light source (11) and the light-receiving device (31) are explained.

As shown in FIGS. 2(1) to 2(6), the state (matching state) where there is light source $LD_1$ right above the light-receiving device $Li_1$ (1), is considered as the θ=0 degree position (starting point) of the rotation angle of the rotator (1), and the direction of CW (clockwise rotation) is considered as the positive rotation.

It is the attention point that the θ is the rotation angle $LD_1$, and in $LD_2$, the bias angle will be added to the θ.

Now, although the light-receiving possible region (35) is decided by the optical characteristic of the POF or the POFC, the attainment light source region (25) can be adjusted by the optical system and the optical path length of the light system such as a collimator and an aperture which the light output device (21) has.

Therefore, by these means, since the light-receiving possible region (35) can be installed without a space on the circumference of the circle O of the stator, the light-receiving device (31) is made into the structure which can receive the light without the exfiltration of the light source (11) output on the circumference.

As mentioned above, it is considered that the light output device (21) or the light-receiving device (31) are located on the attainment light source region (25) and the light-receiving possible region (35) of FIGS. 2(1) to 2(6), respectively, and hereinafter, it is considered and explained that the attainment light source region (25) is the light output device (21), and the light-receiving possible region (35) is the light-receiving devices (31).

Now, under the line condition, there must be the state in which the light-receiving device (31) of the fixed side has always continuously caught the emitting light from the light source (11) in the rotating side, that is, the state in which the light source (11) has always been caught.

This state is called "light source catch."

At this time, the light source (11) exists in the sum of the light-receiving device output of two pieces, or the light-receiving device output of one piece, and any output is also called "a caught light source (14)."

For example, the output of the light source $LD_1$ which exists on the light-receiving devices $Li_1$, and by obtaining the sum of the light-receiving device $Li_1$ output and $Li_2$ output, $Li_2$ shown in FIG. 2(1) becomes the state of the light source catch in the sum.

That is, the operation of obtaining the sum of the light-receiving device $Li_1$ output and $Li_2$ output is called the light source catch, and the sum equals the caught light source (14).

Also, in the case of FIG. 2(2), an independent output of the light-receiving device $Li_2$ becomes the caught light source (14).

At this time, the caught light source (14) becomes the signal which is "the information which the light source has, for example, the data of an image pick-up camera (99) etc.", which the light-receiving device received.

Hereinafter, the caught light source is treated as the embodiment of the sum (the independent embodiment may be treated similarly).

The geometrical condition of the light source catch is explained.

When the multiple light sources (11) exist, the condition needs to enable the signal mixing evasion in addition to the light source catch.

Here, the signal mixing means the state in which the outputted light from the two light sources (11) inputs one light-receiving device (31) simultaneously, and the signal mixing must be avoided.

Now, in order to catch the light source, it is necessary to set up "the geometrical condition in which the light source (11) certainly exists above two light-receiving devices (31)", and there are two conditions.

One is a relation in which the attachment light source circle (diameter)≤the light-receiving possible circle (diameter).

FIGS. 2(1) to 2(6) the attainment light source diameter≈the light-receiving device light-receiving diameter as an example of above-mentioned geometric relation, and the light sources $LD_1$ and $LD_2$ are located on the rotating side, and are respectively on the both ends of the diameter of the circle which makes the rotation axis (4) O point.

On the other hand, the light receiving device (31) is in the fixed side, and the six pieces of light-receiving device (31) are installed on the circumference of the same radius as the circle O in the rotating side so that $LD_1$ and $LD_2$ may be countered.

The reason of the sign of inequality (≤) of the above-mentioned relational equation is understood, if the reverse case is assumed in FIG. 2(2).

That is, if the diameter of the light source is larger than the diameter of the light-receiving device, LD1 and LD2 cover over the three light-receiving devices (31) respectively, it is because the two light-receiving devices will stop being able to carry out the light source catch and the signal mixing will occur.

As mentioned above, for the source catch and the signal mixing evasion, it becomes clear that the geometrical condition about the size of the attainment light source region and the light-receiving possible circle is, the attachment light source circle diameter≤the light-receiving possible circle diameter.

Other geometrical conditions are related to the number of the light sources and the number of the light-receiving device.

Since the light source catch will be formed under the condition of the one light source for the two light-receiving devices, here, by setting up "the light-receiving device of the input light zero state", the quantity terms which perform the signal mixing evasion is examined.

For the sake, the two state, the first state in which the light source exists on only one light-receiving device and the second state in which the light source straddles two light-receiving devices, may be examined individually.

It is because there are only two states, the first state in which the one light source exists only on the state and the second state in which the one light source straddles two light-receiving devices, from the conditions of the attachment light source circle diameter≤the light-receiving possible circle diameter.

First, as seen in FIG. 2(1) in the case of the former (straddle), $Li_6=Li_3=0$ is set.

That is, in the CW rotation, the arrangement is set to $Li_3=0$ for the light source $LD_1$ and is set to $Li_6=0$ B196 for the light source $LD_2$.

Next, in the CCW rotation, the arrangement is set to $Li_6=0$ for the light source $LD_1$ and is set to $Li_3=0$ for the light source $LD_2$.

In this case, it can also be considered that the arrangement called $Li_6=Li_3=0$ is shared by the light source $LD_1$ and $LD_2$.

Next, it is set to $Li_1=Li_3=0$ and $Li_4=Li_6=0$ from FIG. 2(2) in the case of the latter (independent).

The arrangement of this case may also be considered to be the common use.

Now, in fact, the latter "the arrangement which uses each two pieces of right and left as the light-receiving device of the input light zero state" is included in the former "the arrangement which uses each one piece of right and left as the light-receiving device of the input light zero state", and the latter and the former turn into the same arrangement (in fact, FIG. 2(1) and FIG. 2(2) are the same arrangement).

That is, the latter are automatically formed by the former establish.

As mentioned above, the geometric conditions of the signal mixing evasion about the number of the light sources and the light-receiving devices can be summarized as "the arrangement which shares each one of the light-receiving device of the input 1+B20 light zero state with the two pieces of the right and left light-receiving devices which the light source straddles", and can be said that the three light-receiving devices correspond to one light source.

By this means, the geometric relation which fills the number of the light sources or the channel number n and the number N of the light-receiving device will be following formula (1).

[Equation 1]

Light-receiving devices $N=3n$ [formula (1)]

(n; the number of the light sources or the channel number)

Now, although the signal mixing evasion was realized by installing "the light-receiving device with the input light zero state" in the formula (1), this light-receiving device means the light-receiving device which that neither of the light source outputs (it is $LD_1$ and $LD_2$ at the above-mentioned example) is have the input light input into.

Next, although the expression of the numerical formula of the light source catch state of the light source is explained, in the following, the various characteristics over $LD_1$ are described, and since the description about $LD_2$ is completely discussed identically, it is omitted.

First, it is considered that the total output light quantity of light from the light output device of the light source $LD_1$ is set to $P_1$, and the light intensity distribution is uniform.

Also it is considered that the Light source $LD_1$ exists on the both sides of the light-receiving device $Li_1$ and the light-receiving device $Li_2$ as shown in FIG. 2(1), and $P_1$ exists, as it is, without attenuation or loss on the acceptance surface of the light-receiving device (31) by the space propagation.

Then, it can be considered that the total output light intensity $P_1$ of the light source $LD_1$ comprises the part light source of X and the part light source of Y, the part light source X is input into the light-receiving device $Li_1$, and the part light source Y is input into the light-receiving device $Li_2$.

Or, since the light intensity distribution is uniform, all the output light area of the light source $LD_1$ is $P_1$, and the output light area of the part light source to the light-receiving device may be considered to be X and Y.

Now, if the space propagation of this light source is performed in the state where there is no optical loss, since the +B216 sum of the light source of the two part light sources will become equal to the total amount of the entered light, the following formula (2) is obtained.

[Equation 2]

$P_1=X+Y$ [formula (2)]

Here, the state where the light receiving loss can be disregarded can be acquired by changing the shape of the light-receiving possible region and the attachment light source of $LD_1$ from the round shape shown in FIGS. 2(1) to 2(6) to the shape which becomes smaller loss.

For example, if the attainment light source region shape and the light-receiving possible region shape were made into the fan shape (the shape of the paper stuck on the fan), the loss will decrease.

Further in a main subject, since the formula (2) is eventually digitized and is employed, the influence of the loss at the time of propagation can be made small.

Then, the space propagating characteristic of the light source light is "1", that is, the light source light is spatially propagated as it is, and the formula (2) is formed even if the attainment light source region shape and the light-receiving possible region shape are circular, and the next examination is progressed on the assumption the above is formed.

Now, if the formula (2) consisted, conversely the light source $LD_1$ will exist on the light-receiving device $Li_1$ and $Li_2$.

Therefore, the formula (2) can be defined the relational equation of the light source catch.

The formula (2) can also be considered that the part light source X is outputted from the light-receiving device $Li_1$, the part light source Y is outputted from the light-receiving device $Li_2$, and the sum is equal to $P_1$.

That is, if X in the formula (2) is set to the output light intensity $Li_1$ from the light receiving device $Li_1$, and if Y is set to the output light intensity $Li_2$ from the light-receiving device $Li_2$, the following formula (3) will be obtained.

[Equation 3]

$P_1=Li_1+Li_2$ [formula (3)]

The formula (3) will turn into the relational equation showing the light source catch by POFC, if the output sum of the two light-receiving devices (31) called $Li_1$ and $Li_2$ is obtained by 2×1POFC (51).

Also the formula (3) can be considered that the light source information which is divided into the two light sources $Li_1$ and $Li_2$ is transmitted to the sum embodiment of the caught light source (14), if it is seen from the viewpoint of the information transmission.

Now, the continuous method of the light source catch state between the two caught light sources is explained.

That is, they are the "maintenance operating method of the light source catch in case the light source switches from the state of being on the light-receiving device $Li_1$ and $Li_2$ to the state of being on the light-receiving device $Li_2$ and $Li_3$."

That is, they are the "light source catch operating method between the three light-receiving devices of the light-receiving device to $Li_1$ and $Li_3$."

The continuation of the light source catch state, at first, means the delivery operation of the light source (11) between "the caught light source generated on the both sides of the output of $Li_1$ and $Li_2$" and "the caught light source generated on the both sides of $Li_2$ and $Li_3$", and is called a catch switching.

Now, at first, the caught light source generated on the both sides of $Li_1$ and $Li_2$ is called an switching source light source, after that, the caught light source which moved onto the both sides of $Li_2$ and $Li_3$ is called an switching target light source (that is, temporally it becomes the caught light source in the order from the switching source light source to the switching target light source).

Then, in the switching from this switching source light source to the switching target light, source, if "the caught light source constituted from the switching target light source and the switching source light source" is generated, and if the switching operation from the switching target light source to the switching source light source is performed, the logic that the light source catch is also maintainable at the switching time is realized.

Then, this light source that is carrying out the light source catch also at the time of the capture switching is called "a switching-time light source (15) (the light source in which the light source was maintained also at the switching time)."

That is, it means "the caught light source constituted from the switching target light source and the switching source light source" in the dynamic state of the light-receiving device switching, and is a technique that the capture switching is carried out for the switching-time light source.

This switching-time light source (15) is explained.

The function of the switching-time light source is the maintenance of the light source catch under the capture switching operation.

The maintenance function is classified into the following two.

That is, one is a time-axis connection function of the circuit signal (7) of the switching source light source and the switching target light source, and other is a function in which the quantity of state (for example, the size of the video signal of an image pick-up camera) of each circuit signal (7) is controlled to the value in which the light source catch can be realized.

First, the technique of giving the switching-time light source the function to connect the time-axis of the two circuit signals smoothly is explained.

Generally, MBB (Make Before Break contacts) type switching-time operation, that is, the switching method called "first-in last-cut type change operation" is applied to this technique.

if the switching source light source is expressed ($\alpha$) and the switching target light source is expressed ($\beta$), when switching from ($\alpha$) to ($\beta$), MBB means the operation that ($\alpha$)=($\beta$), what is called, the conduction (equivalent) operation in the switching device, and means the switching operation order which transmits the information on the light source (11) to ($\beta$) before the light source (11) disappears from ($\alpha$).

Here, the former conduction (equivalent) operation is called the switching operation, the latter switching operation order is called a "MBB type switching order".

By this means, the smooth connection of the time-axis is attained, and the continuity of the circuit signal (7) can be secured.

Next, although there is the function to secure the quantity of state in which the light source catch is realized for the circuit signal of the switching source and the switching target, this is "an embodiment of the switching-time light source". The embodiment of the switching-time light source is explained hereinafter, at first, at a switching operation start time, ($\alpha$) must be the caught light source.

Next, at the time after the catch switching operation, ($\beta$) must be the caught light source from the necessity of outputting outside.

Now, there are two embodiments, the following #1 and #2 as the switching-time light sources which should be generated.

1; The embodiment of the conduction (equivalent) of ($\beta$)=($\alpha$)

This case is the embodiment that the both sides of ($\alpha$) and ($\beta$) are the caught light sources, and the switching-time light source is called the embodiment of ($\beta$)=($\alpha$) (or the embodiment of #1).

This switching-time light source corresponds to the switching situation where the light source once moves via the state ($\beta$=$\alpha$) where the two caught light sources become equivalent, when the delivery operation of the light source (11) is performed between the two caught light sources of ($\alpha$) and ($\beta$).

A switching order at this time is the switching operation order of the above-mentioned MBB type.

2; the embodiment of the sum of ($\beta$+$\alpha$)

This is an embodiment applicable to both the cases where ($\beta$) is not the caught light source and ($\beta$) is caught light sources, it is called the embodiment (or the embodiment of #2) of ($\beta$+$\alpha$).

When the delivery operation of the light source (11) is performed between the two caught light sources of ($\alpha$) and ($\beta$), this switching-time light source corresponds to the switching situation where the light source moves within the sum of the two caught light sources.

Also at this time, the switching procedure from ($\alpha$) to ($\beta$) is followed in order of a MBB type change, after generating the switching-time light source of ($\beta$+$\alpha$).

Now, the switching-time light source has the characteristic of being determined "uniquely" for every specific position.

Here, the "time" of "the switching time" means a position in which the switching operation from the light source $\alpha$ to the light source $\beta$ is performed.

Then, hereinafter the switching-time light source applied in the latter part is concretely sought.

In the following, the "position" of the switching-time light sources, in the embodiment of #1, is the position where the light source exists right above $Li_2$ as shown in FIG. 2(2), in the embodiment of #2, the "position" is the position where the light source exists on the equal portion on both sides of $Li_2$ and $Li_3$ as shown in FIG. 2(3).

In this case of the structure in which POFC (51) exists in between ($Li_1$ and $Li_2$) and between ($Li_3$ and $Li_4$), respectively, since they are the $\alpha=(Li_1+Li_2)$ and the $\beta=(Li_2+Li_3)$, it becomes the following.

[Equation 4]

the embodiment of #1; $(Li_1+Li_2)=(Li_2+Li_3)=P_1/2$    [formula (4-1-1)]

the embodiment of #2; $(Li_1+Li_2+Li_3)=P_1$    [formula (4-1-2)]

Since the above #2 shows "the state where the $\alpha$ and $\beta$ are formed simultaneously", if it is $Li_3=0$, it will become the switching source light source, so it becomes the $\alpha=(Li_1+Li_2)$, and if it is $Li_1=0$, it will become the switching target light source, so it becomes the $\beta=(Li_2+Li_3)$.

In the case of a structure in which POFC (51) exists in between in between ($Li_1$ and $Li_2$) and between ($Li_3$ and $Li_4$), respectively, since the $\alpha=(Li_1+Li_2)$, and the $\beta=(Li_3+Li_4)$, it becomes the following.

[Equation 5]

the embodiment of #1; $(Li_1+Li_2)=(Li_3+Li_4)=P_1/2$    [formula (4-2-1)]

the embodiment of #2; $(Li_1+Li_2)=(Li_3+Li_4)=P_1$    [formula (4-2-2)]

Here, the formula (4-1-1) etc. and the formula (4-2-1) etc. is respectively called an continuous type new light source and a discrete type new light source in the latter part, and are the switching-time light source of the light source.

Now, "the light source catch and the capture switching" are applied and the new light source is generated.

The caught light source (14) is generated on the fixed side, and it is called the new light source (13).

The object is an addition of the characteristic which is not in the original light source (11).

And the configuration method of the circuit system using this new light source (13) is called a "new light source method."

Now, the construction process of the circuit system by the new light source method is divided into two processes.

One is the generation process of the new light source of transporting the light source (11) from the rotator (1) to above the stator (2).

Other is the restoration process of the light source of restoring the light source, (11) on the external output terminal (66) from the new light source.

First, the generation process of the former new light source is explained, next, the restoration process of the latter light source is explained.

Here, the demand for the new light source generation process is generating the light source equivalent to the light source (11) of the rotating side on the fixed side.

First, although the type of output signal of the new light source is explained, there are two kinds.

One is "a new light source of the light signal" generated using the POFC (51), and other is "a new light source of the electric signal", which is generated using the output after the photo detector directly receive the emitting light from the light source, without using the POFC.

The characteristic of the new light source of the latter electric signal is included in the characteristic of the light signal.

First, the new light source of the light signal is the caught light source generated using the transfer function and the combining function of the light source which the POFC has, and is outputted from the optical circuit which connected the optical coupling unit (50) to the output of the light-receiving device (31).

Now, the new light source is divided into three kinds as follows.

A continuous type new light source (100); the caught light source generated among all the adjacent light-receiving device outputs, and the light source group which has characteristic that the spatial distribution width of the circumferential direction is constant.

It is abbreviated to the new light source A.

Figure 3:
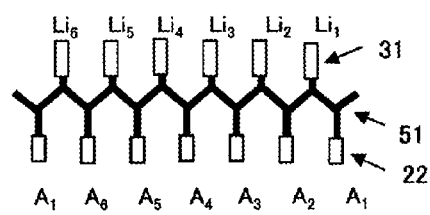
FIGS. 3(1) to 3(3) are generated light circuits of a new light source of a light signal.
Figure 3:
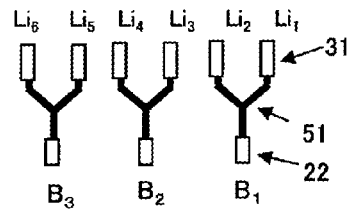
Figure 3:
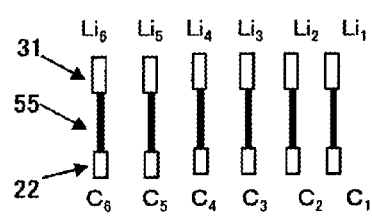

Referring to FIG. 3(1).

A discrete type new light source (200); the light source group in which the spatial distribution width of the circumferential direction changes with the rotary position, and is the caught light source which carries out the alternation of the generation and the non-generation.

It is abbreviated to new light source B.

Referring to FIG. 3(2).

A transported type new light source (300); the light source group having the characteristic that the caught light source is transported from the light-receiving device position to the new light output device (22) position, and is the caught light source which is generated from the output of the independent light-receiving device.

It is abbreviated to new light source C.

Referring to FIG. 3(3).

Now, FIGS. 3(1) to 3(3) are the development drawings of the plane including the point of contact and the rotation axis of the circles $Li_1$ and $Li_6$ of FIGS. 2(1) to 2(6).

First, when the new light source A is right above the light-receiving device $Li_2$, in order that the outputs of the caught light source $(Li_1+Li_2)$ and $(Li_2+Li_3)$ may be made the optical circuit which is generated simultaneously symmetrically, the output of the light-receiving device $Li_2$ is branched into two.

Therefore, the structure is the structure of FIG. 3(1) which combines the two branched outputs of the light-receiving device, and the caught light source group generated in this light circuit is a continuous type new light source (100).

Next, the new light source B has the structure which generates the caught light source without branching each light-receiving device output into two outputs, when the light source is above the light-receiving device $Li_1$ and $Li_2$, although the caught light source $(Li_1+Li_2)$ is generated, on the other hand, when it is above $Li_2$ and $Li_3$, the caught light source $(Li_2+Li_3)$ is not generated and it becomes the optical circuit of FIG. 3(2).

Therefore, this light source becomes the discrete type new light source (200) of the separated embodiment in which the position where the caught light source is generated is separated.

Next, the new light source C is the caught light source group which connects the light-receiving device (31) and the new light output device (22) by the POF (56) as shown in FIG. 3(3) and is generated.

That is, it is the optical circuit structure which transfers the light-receiving device output to the new light output device output as it is and becomes a criterion at the time of the characteristic comparison of the new light source A and the new light source B.

Next, first, the structure of a generated light circuit of the new light source A is explained based on FIG. 3(1).

After branching the output of the light-receiving device $Li_1$ to $Li_3$ into 1×22, respectively, the two output light openings which adjoin each other are combined by another 2×1POFC (51), and the optical circuit emitting the light signals which a attached the numerals of $A_1$ to $A_3$ is shown.

At this time, the name and value of the output are called $A_1$ to $A_6$ and they are comprehensively called A signal.

Therefore, as shown in the drawing, the caught light source $A_1$ to $A_6$ become the new light source $A_1$ to $A_6$.

Next, as clearly seen from FIG. 3(2), the new light source B is the light signal that combined the outputs of the light-receiving device $Li_1$ and $Li_2$ by the 2×1POFC (51), similarly and combined the outputs of the light-receiving device $Li_3$ and $Li_4$, $Li_5$ and $Li_6$ by POFC (51) respectively.

That is, it is the optical circuit which constituted the optical coupler (501) of FIG. 2(5) as 2×1POFC.

And the name and the value of this optical circuit output are called $B_1$ to $B_3$.

Likewise, as for this new light source, the caught light source $B_1$ to $B_3$ similarly become the new light source $B_1$ to $B_3$.

In FIG. 3(3), the new light source C is the output of the optical circuit which connects the output of one piece of the light-receiving device to one new light output device (22) via one POF (56).

That is, it is the optical circuit which constituted the optical coupler (501) in FIG. 2(5) as one piece of POF.

Now, the POFC (51) of the new light sources A and B is called Y character optical circuit from the shape of Y character, and their numerals are set to $Y_1$ to $Y_6$ etc.

The new light source C is called I character optical circuit.

Figure 4:
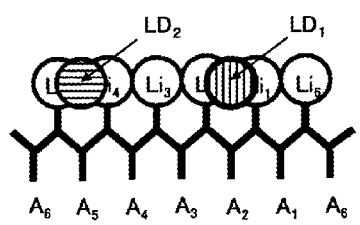
FIGS. 4(1) to 4(3) are generations of a continuous type new light source and a discrete type new light source ((two channels).
Figure 4:
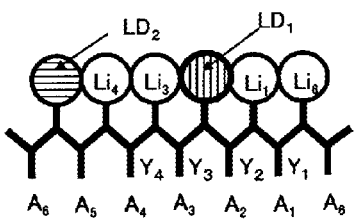
Figure 4:
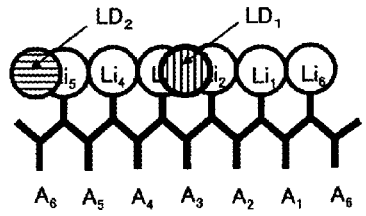

The output characteristic of the new light source A and B are explained using FIGS. 4(1) to 4(3) (since the new light source only has the relation that the light-receiving device output is equal to the new light source, the details are omitted).

Hereinafter, it is assumed that the circuit signal (7) comprises two channels, and the circuit signal of the 1st channel of them is set to $Ch_1$, the light source is written as $LD_1$ and the output is written as $P_1$ (in the case of the 2nd channel, $Ch_2$, $LD_2$, and $P_2$).

FIGS. 4(1) to 4(3) show the generation situation of the new light source A (the upper figure) and the new light source B (the lower figure), and is the drawing which is the plane deployment under the same circumstance as FIGS. 2(1) to 2(6).

In FIGS. 4(1) to 4(3), the light source and the light-receiving device are drawn from the viewpoint of the upper surface as shown in FIGS. 2(1) to 2(6), and the optical circuit which comprises the POFC (51) is drawn from the viewpoint of the side as shown in FIG. 3(1) and FIG. 3(2), so the generated light circuit of the new light source is shown in FIGS. 4(1) to 4(3).

Now, FIG. 4(1) corresponds to FIG. 2(1), and the light source $LD_1$ is located in the position which is θ=30 degrees and is in the state existing in division into equal parts on the both sides of $Li_1$ and $Li_2$. FIG. 4(2) corresponds to FIG. 2(2), and FIG. 4(3) shows the state correspond to FIG. 2(3).

Among the above, as a representation position of 0 degrees≤θ≤60 degrees, the state of FIG. 4(1) is taken for an example, and the output value of the new light source (13) is calculated.

First, the output characteristic of the new light source A is sought.

As shown in FIG. 4(1), for the light source $LD_1$ which exists ranging over the both $Li_1$ and $Li_2$, the each output of the light-receiving device $Li_1$ and $Li_2$ is examined as being branched by 2×1POFC (51) of the branching ratio of (1:1).

Now, for both the outputs of the light-receiving device $Li_1$ and $Li_2$, if the formula (3) is applied, the new light source output of $LD_1$ can be shown like the following formula (5).

[Equation 6]

$A_1 = (Li_6/2 + Li_1/2)$ ... (In the following, Expressed as $(Li_6+Li_1)/2$)

$A_2 = (Li_1/2 + Li_2/2)$ ... (In the following, Expressed as $(Li_1+Li_2)/2$)

$A_3 = (Li_2/2 + Li_3/2)$ ... (In the following, Expressed as $(Li_2+Li_3)/2$)

$Li_1 + Li_2 = P_1$ [formula (5)]

Now, the formula (5) shows that the output of one piece of the light source $LD_1$ is changed into the output of three pieces of the new light source $A_1$-$A_3$.

Next, when the characteristic in the position of 0≤θ≤60 degrees position are sought, since the light-receiving device $Li_6=0$ and $Li_3=0$ are set to the formula (5), the formula (5) becomes the following formula (5a).

[Equation 7]

$A_1 = (Li_1/2)$ $A_2 = (Li_1 + Li_2)/2$ $A_3 = (Li_2)/2$ $Li_1 + Li_2 = P_1$ [formula (5a)]

The formula (5a) shows that the light source $LD_1$ is caught in the three new light sources $A_1$ to $A_3$, that is, the three new light sources is generated for the light source $LD_1$.

Since the new light sources of $LD_2$ are shown by $A_4$ to $A_6$ like the above, it is shown that the new light source $A_1$ to $A_3$ of $LD_1$ are unrelated to the new light source $A_4$ to $A_6$ of $LD_2$ and the signal mixing is also avoidable.

That is, the formula (5) can be said the output characteristic formula of the new light source A.

Now, based on a formula (5a), the value of $A_1$ to $A_4$ in the specific angle is calculated.

*@θ=0 degree; $Li_1=P_1$ and $Li_2=0$, and so $A_1+A_2P_1/2$, and $A_3=0$.

*@θ=30 degree; $Li_1=Li_2=P_1/2$, so $A_1=P_1/4$, $A_2=P_1/2$, and $A_3=P_1/4$.

These calculated values are shown in the range of 0 degrees≤θ≤30 degrees of $LD_1$ of FIG. 5.

Here, as for FIG. 5, the horizontal axis means the rotation angle position θ in which the light source $LD_1$ exists, the vertical axis means the output position of $A_1$-$A_6$ of the POFC (51).

That is, FIG. 5 shows the output value in the position $A_1$ to $A_6$ of the new light source A of FIGS. 4(1) to 4(3) in the angular position in which $LD_1$ exists.

Here, the notation enclosing a plurality of light sources with ( ), as shown in ($A_1$, $A_2$, $A_3$), means the spatial parallel arrangement of each light source, that is, the light source sequence. On the other hand, if the sum of those outputs is denoted by the addition form as shown in ($A_1+A_2+A_3$), this means one light source (output).

For example, the new light source sequence ($A_1$, $A_2$, $A_3$) shows the source group of the input light to 3×1POFC, and the ($A_1+A_2+A_3$) shows the output from the POFC.

Now, the output characteristic of the new light source corresponding to $LD_1$ can be calculated by repeating the above mentioned same calculation operation in the further rotary position of 30 degrees or more.

Since it can be also developed similarly to the light source $LD_2$, the output characteristic of the new light source A of the two channels becomes FIG. 5.

At this time, FIG. 5 shows that the new light source sequence of the light source $LD_1$ is enclosed with a black thick frame, and the light source $LD_2$ portion is shaded.

Now, the movement state of the black frame accompanying the rotation is explained based on FIG. 5.

First, when it is in 0 degrees≤θ≤60 degrees, the light source (11) is caught in the three new light source sequences ($A_1$, $A_2$, $A_3$) enclosed with the black thick frame of $LD_1$ of FIG. 5.

Next, when moving among 60 degrees≤θ≤120 degrees, the black frame which shows LD1 existence region changes from ($A_1$, $A_2$, $A_3$) to ($A_2$, $A_3$, $A_4$), and it shows the situation which the black frame moves into the direction of the lower left.

The light source catch state at the time of this moving is explained quantitatively.

In 0 degrees≤θ≤60 degrees in which the light source $LD_1$ exists on $Li_1$ and $Li_2$, since the new light source A is the structure which carries out the-light source catch by the sum of the $Li_1$ output and the $Li_2$ output, if the formula (5a) is applied, it is as follows.

[Equation 8]

$$(Li_1 + Li_2) = (Li_1/2 + Li_1/2) + (Li_2/2 + Li_2/2) \quad \text{[formula (6-1)]}$$
$$= (Li_1/2) + (Li_1/2 + Li_2/2) + (Li_2/2)$$
$$= (A_1 + A_2 + A_3)$$
$$= P_1$$

Next, when the light source moves to 60 degrees≤θ≤120 degrees, since it is the structure in which the light source catch is carried out in the output sum of $Li_2$ and $Li_3$, it is shown as follows likewise.

[Equation 9]

$$(Li_2 + Li_3) = (Li_2/2 + Li_2/2) + (Li_3/2 + Li_3/2) \quad \text{[formula (6-2)]}$$
$$= (Li_2/2) + (Li_2/2 + Li_3/2) + (Li_3/2)$$
$$= (A_2 + A_3 + A_4)$$
$$= P_1$$

From the above, in order to be in the state where the light source is completely caught in the new light source A, it is good that the sum of the three new light sources just is $P_1$.

Therefore, the three new light sources enclosed with the black thick frame are the new light source sequences in which the sum of them is set to $P_1$, and FIG. 5 will describe it over the full-size degree range (the case of $LD_2$ is same case).

Next, the information transmission of the light source (11) in the inside of this new light source sequence is explained as an example of the new light source sequence $(A_3, A_2, A_1)$ * of $LD_1$.

*) The reverse order display of $(A_3, A_2, A_1)$ is for the describing to give the priority to the consistency with the array order of the new light source in the horizontal axis in FIG. 5.

Now, in the three new light source sequences $(A_3, A_2, A_1)$ outputted from the POFC (51), $A_1$ equivalent is called the right light source, and $A_2$ equivalent are called the central light source, and $A_3$ equivalent is called the source of the left light source.

Here, the reason that they are named "equivalent" is because the new light source in the movement position likes $(A_4, A_3, A_2)$ etc. is called similarly.

Now, since the new light source of the central light source is expressed as $A_2=(Li_1+Li_2)/2$ from the formula (5), the output value of the light source (11) always becomes the half size $(=P_1/2)$, but since the amount of information itself is the same as that of the caught light source $(=(Li_1+Li_2))$ of the light-receiving device $Li_1$ and $Li_2$, so the new light source can be said the caught light source with the light source information of the both sides of $Li_1$ and $Li_2$, that is, the caught light source with the total information of the light source.

That is, in the new light source A, it will be that the light source information independently exists in the central light source.

Next, since in FIG. 5 the circuit signal (7) comprises the two channels, FIG. 5 has the structure where the channel interchanges completely at 180 degrees (the same pattern between 0 degrees≤θ≤180 degrees pattern and 180 degrees≤θ≤360 degrees pattern).

And since the one light source comprises the three new light sources, it is shown that the inside of the 180 degrees angle range also further is divided into the three patterns of every 60 degrees.

The output characteristic of the new light source B is explained.

The greatest difference from the new light source A of the upper figure of FIGS. 4(1) to 4(3) is the point that the new light source equivalent to A3 $(=(Li_2+Li_3)/2)$, A5, and $A_1$ in six new light sources A of FIG. 3(1) does not exist, because the new light source B has the part where the POFC (51) does not exist between two light-receiving devices.

Now, the calculation formula of the new light source B that corresponds to the formula (5) is sought.

When $LD_1$ is located on the both of $Li_1$ and $Li_2$, that is, in the state of 0 degrees≤θ≤60 degrees, the output formula will become the following formula (7).

[Equation 10]

$B_1=(Li_1+Li_2)$ $B_2=(Li_3+Li_4)$ $B_3=(Li_5+Li_6)$ $Li_1+Li_2=P_1, Li_4+Li_5=P_2$ [formula (7)]

The value of $B_1$-$B_3$ which was calculated with reference to the lower figure of FIGS. 4(1) to 4(3) is shown below.

At the time of θ=0 degree, since it is set to $Li_1=P_1$, $Li_2=0$, $Li_3=0$, $Li_4=P_2$, $Li_5=0$, and $Li_6=0$, so it is set to $B_1=P_1$, $B_2=P_2$, and $B_3=0$.

At the time of θ=30 degrees, since $Li_1=P_1/2$, $Li_2=P_1/2$, $Li_3=0$, $Li_4=P_2/2$, $Li_5=P_2/2$, and $Li_6=0$, so it is set to $B_1=P_1$, $B_2=P_2/2$, $B_3=P_2/2$.

The output characteristic of the new light source B in the full-width degree range is shown in FIG. 6 (it corresponds to FIG. 5 of the new light source A).

FIG. 6 shows the same table constitution as FIG. 5, in the output value of the new light source B of each angle, the capture region of the light source $LD_1$ is enclosed with the black thick frame and the light source LD2 portion is shaded.

Next, although the switching-time light source (15) is sought, first it starts from the new light source A.

Since the new light source A is the structure where the POFC (51) exists between ($Li_1$ and $Li_2$) and between ($Li_2$ and $Li_3$) respectively, in the θ=60 degrees, it becomes the $\alpha=(Li_1+Li_2)$ and the $\beta=(Li_2+Li_3)$ from the formula (4-1-1) and (4-1-2).

On the other hand, since $(Li_1+Li_2)$ and $(Li_2+Li_3)$ can be denoted by A signal respectively, if the formula (6-1) and the formula (6-2) are used, they become the $\alpha=(A_1+A_2+A_3)$ and the $\beta=(A_2+A_3+A_4)$.

Therefore, the switching-time light source at the θ=60 degrees of the new light source A becomes the following two embodiments.

(i) When it is considered that the switching-time light source of the embodiment of #1 is constituted In this case, from the formula (4-1-1), the $\alpha$=the $\beta$, that is, the state of $(A_3+A_2+A_1)=(A_4+A_3+A_2)$ are set to $(A_2)=(A_3)=P_1/2$ as been clearly seen from the upper figure in FIG. 4(2).

By this means, It can be considered that the new light source group is generated through the state where the two catch light sources will become equivalent and it becomes equivalent.

By the way, in the θ=60 degrees, since both $(A_2)$ and $(A_3)$ are the central light sources, they become the caught light source, and the capture switching will be realized.

(ii) When it is considered that the switching-time light source of the embodiment of #2 is constituted In this case, from the formula (4-1-2), the switching-time light source of $(\beta+\alpha)$ is shown as the following.

[Equation 11]

$$\begin{aligned}(Li_1 + Li_2 + Li_3) &= (Li_2/2 + Li_2/2) + \\ &\quad (Li_2/2 + Li_2/2) + \\ &\quad (Li_3/2 + Li/2) \\ &= (Li_1/2) + (Li_1/2 + Li_2/2) + \\ &\quad (Li_2/2 + Li_3/2) + (Li_3/2) \\ &= (A_1 + A_2 + A_3 + A_4) \\ &= P_1\end{aligned}$$ [formula (4-3)]

In this case, via the catch state that the light source (11) exists on ($Li_2$ and $Li_1$), that is, the light source catch state that the light source (11) exists on the $\alpha=(A_1+A_2+A_3)$ and on ($Li_3$ and $Li_2$), that is, the state that the $\beta=(A_2+A_3+A_4)$ is formed simultaneously, the new light source group is generated and becomes equivalent.

By this means, it can be considered that at the θ=60 degrees position, the light source (11) constitutes the switching-time light source of the embodiment of #1 or #2, and by performing the capture switching in order of the MBB type, the new light source A is generated.

That is, since the generation process of the new light source A can be explained also for any switching-time light source of the embodiment of #1 and #2, in the generation process of the new light source, rotating, the new light source (13) is switched along with the light source (11) automatically, so the situation where the equivalent new light source is generated is realized.

The situation at the time of the capture switching of the new light source A is seen as the transition of the light signal in the POFC (51) (refer to the upper figure of FIG. 4(2)).

In the θ=60 degrees position, since it is $(A_1)=0$ and $(A_4)=0$, the light signal does not exist in $Y_4$ optical circuit and $Y_1$ optical circuit.

When the light-receiving device (31) in which the light source exists is switched, by performing the switching operation of $Y_4$ and $Y_1$ optical circuit where the light signal does not exist, the capture switching operation is performed.

And since the light signal does not exist in $Y_4$ optical circuit at this time, it will be also building the optical path before the arrival of the light source.

As a result, it can be said that the continuity of the light source information is secured and the equivalent light source is realized.

Next, the switching-time light source of the new light source B is sought.

In the new light source B, the above-mentioned caught light source like $(Li_2+Li_3)$ does not exist, but as shown in formula (7), it becomes $(Li_1+Li_2)=(B_1)$ and $(Li_3+Li_4)=(B_2)$.

Therefore, as the formula (4-2-1) described, it becomes the $\alpha=(Li_1+Li_2)$ and the $\beta=(Li_3+Li_4)$.

Therefore, it can be considered that the new light source B is generated as follows like the new light source A.

(i) When it is considered that the switching-time source of the embodiment of #1 is constituted In this case, from the formula (4-2-1), it is considered that at the θ=90 degrees, the new light source group is generated through the state where the two caught light sources called $(B_1)=(B_2)=P_1/2$ become equivalent, and it becomes equivalent.

(ii) When it is considered that the switching-time light source of the embodiment of #2 is constituted, the switching-time light source of this case is as the follows in 60 degrees≤θ≤120 degrees (60 degrees is included).

[Equation 12]

$$(Li_1 + Li_2) + (Li_3 + Li_4) = (B_1 + B_2) \quad \text{[formula (4-4)]}$$
$$= P_1$$

As mentioned above, in the case of the new light source B, from above (i) and (ii), in the angle range of 60 degrees≤θ≤120 degrees, the light source (11) constitutes the switching-time light source of the embodiment of #1 or #2, and by carrying out the capture switching in order of the MBB type, it can be considered that the light source catch can be made to be able to continue and the new light source B is generated.

Then, it can be interpreted as the follows, in the new light source B, although the POFC (51) does not exist between $Li_2$ and $Li_3$ etc., the light source (11) can perform the capture switching for the switching-time light source of the embodiment of #1 and #2, and the equivalent light source is generated.

The structure and the characteristic of "the new light source space" are explained.

If the space where the air optical path exists and propagates from the light source (11) to the light-receiving device (31) is called "light source space", FIG. 2(1) to 2(3) can be also said the line condition figure in the light source space which put in order without the space the light-receiving possible region (35).

On the other hand, the new light source is in the state distributed over the circumferential direction, and since it rotates synchronizing with the light source, it can be considered to constitute "a new source space."

Then, the space where the air optical path of the new light source (13) which is propagated into the new light-receiving device (32) newly installed to receive the new light source exists, is called "the new light source space".

Then, in order to perform the line in the new light source space, the structure that the light-receiving possible region of a new light-receiving device (32) is put in order without a space, is good.

This means that a "migration of the space which performs optical transmission" can be performed, if the new light source space is constituted in the position different from the light source space.

By this means, since the circuit system by the new light source method performed the space transmission in the light source space and the new light source space, the total of the two space transmissions will be performed.

By the way, if the above-mentioned switch system is seen from this viewpoint, the switch system can be said to be the circuit system which performs the space optical transmission of only 1 time in the light source space.

Now, in order that the new light source distribution in the new light source space is shown, the plane on which the attainment light source region (25) (not being the light-receiving possible region) are put in order without the space, is shown in FIG. 7(1).

FIG. 7(1) is explained as the two-channel system like FIGS. 2(1) to 2(3).

First, the size of the attachment light source circle (25) is defined by the size of the central angle which is stretched for the attachment light source.

That is, it means that the attachment light source have the size of the angle which expects this circle from the center-of-rotation O point (the light-receiving possible circle is also the same).

For example, since the light-receiving possible circle in FIG. 2(1) is "installed without a space" on the circumference of the circle O, it will constitute 360 degrees from the sum of the six central angles of each light-receiving possible circle of $Li_1$ to $Li_6$.

Therefore, if $\angle L_1$ shall show the central angle of the light-receiving possible circle of the light-receiving device $(Li_1)$, it is as follows.

[Equation 13]

$$\angle Li_1 + \angle Li_2 + \ldots + \angle Li_6 = 360° \quad \text{[formula (8)]}$$

Here, if the symmetry is applied to formula (8), it will be set to $\angle Li_1 = \angle Li_2 = \ldots \angle Li_6$.

So, it can be said that the light-receiving possible circle, that is, the light-receiving devices $Li_1$ to $Li_6$ have the 60 degrees central angle, respectively.

Next, since the size of the light source $LD_1$ was set that the attachment light source circle diameter≈the light-receiving possible circle diameter, the central angle of the attachment light source circle of $LD_1$ will be equal to the central angle of the light-receiving possible circle, and will be 60 degrees.

That is, it can be said that the light source $LD_1$ has a size of 60 degrees of the central angles in "light source space."

Now, FIGS. 2(1) to 2(3) has been interpreted as the line condition figure in the inside of the light source space which comprises the light source (11) and the six light-receiving devices (31).

However, FIG. 2(1) to 2(3) can also be regarded as the development drawing of the new light source C outputted from 1×1POFC connected to the light-receiving device (31) as shown in FIG. 3(3).

Then, the formula (8) can be regarded as the relational equation of the new light source (13) in the "new light source space."

As a result, the size of the attachment light source circle of the new light source space can also be said to be 60 degrees.

Therefore, it can be said as the follows about the size of the attachment light source circle.

The attachment light source circle of a new light source (13) of "the new light source space"=the attachment light source circle of the light source (11) of "the light source space"=60 degrees Now, If the ratio of the size of the light source in "the light source space" and "the new light source space" is called the enlarged ratio, it will be set to the enlarged ratio=1 of the new light source C of FIG. 3(3).

Hereinafter, this characteristic of the new source C is defined as the criterion at the time of the characteristic comparison of the new light source A and the new light source B.

The size of each new light source (13) of the new light source A (continued type) and the new light source B (discrete type) are sought as the size of the central angle of the attachment light source circle in the new light source space.

In the case of the new light source A

If the size of the attachment light source circle of the new light source A is expressed as the central angle $\angle A_1$ of the attachment light source circle of the new light source ($A_1$), and is described it like formula (8), the following formula (8A) will be obtained.

[Equation 14]

$$\angle A_1 + \angle A_2 + \angle A_3 + \angle A_4 + \angle A_5 + \angle A_6 360° \qquad \text{[formula (8A)]}$$

If the symmetry is applied to the formula (8A) here, it can be said the $\angle A_1 = \angle A_2 = \angle A_3 = \angle A_4 = \angle A_5 = \angle A_6 = 60$ degrees.

By this means, the arrangement of the new light source in "the new light source space" becomes as shown in FIG. 7(1), and will become the same as the arrangement which replaced the light-receiving device in FIG. 2(1) to 2(3) with the new light source.

The size of the three new light sources (13) in the new light source space becomes the following from the above.

[Equation 15]

$$\angle A_1 + \angle A_2 + \angle A_3 = 180° \qquad \text{[formula (8B)]}$$

Now, since the size of the light source LD1 is 60 degrees in the central angle of the "light source space" and the size of three pieces in the "new light source space" of the new light source A is 180 degrees as the mentioned above, so the enlarged ratio is set to 3.

By this means, the new light source A can be said the new light source (13) of the structure which rotates in the state spread 3 times as angle ranges as that of new light source C of FIG. 3(3).

It should be note that at the time of the θ rotation of the light source (11), the three new light sources (13) don't rotate in 3θ rotation.

This means the space structure that the light source rotates synchronously in the state that the light source's existence angle range is 3 times larger.

For example, if the light source $LD_1$ of the central angle=60 degrees shown in FIGS. 2(1) to 2(6) rotates in 60 degrees turn, it means that the three new light source $A_1$-$A_3$ corresponding to $LD_1$ shown in FIG. 7(1) will rotate in 60 degrees turn, while occupying the angle range of 180 degrees.

By this means, when switching the new light source in the new light source space, it is possible to switch by the new light source of one end, such as the right light source (equivalent $A_1$) or the left light source (equivalent $A_3$), while the central light source (it is equivalent to $A_2$ with light source information) among the three new light sources, is left without switching, so the line which secured continuity will be realized.

[In the Case of the New Light Source B]

The new light source B may be treated like the case of the new light source A.

In the plane position where the attainment light source region of the new light source is put in order without a space since the new light source B of the two channels is shown like formula (7),

[Equation 16]

$$\angle(B_1) + \angle(B_2) + \angle(B_3) = 360° \qquad \text{[formula (8C)]}$$

from the symmetry, $\angle(B_1) = \angle(B_2) = \angle(B_3) = 120$ degrees can be obtained.

Therefore, the output distributive characteristic in the new light source space of the new light source B come to be shown in FIG. 7(2).

In the drawing, in the angle range where the light source $LD_1$ exists ranging over $Li_1$ and $Li_2$, since the value of ($B_1$) in the output of ($Li_1 + Li_2$) will continue, the 120 degrees angle range of the new light source space correspond to the characteristic of the output constant (the output is uniform).

Next, in the case of the new light source B, like the new light source A, the distribution range in the one new light source space of the light source $LD_1$ is set to two which are not symmetrical in the circumferential direction.

Clearly, when the light source (11) is on the light-receiving device ($Li_1$ and $Li_2$), the occupancy angle degree range of the "new light source space" will be $\angle(B_1) = 120$ degree, but, for example, in the θ=90 degrees position, since the light source will be on two light-receiving devices ($Li_2$ and $Li_3$), as understood also from FIG. 4(3), the occupancy angle degree range of the "new light source space" will be $\angle(B_1 + B_2) = 240$ degree.

On the other hand, since the size of the light source $LD_1$ in the "light source space" is 60 degrees, an enlarged ratio has two, 2 and 4, and changes at the angular position.

That is, the new light source B will rotate while replacing the section of twice in the enlarged ratio with the section of 4 times in the large ratio.

That is, in the new light source space, the new light source B have the structure of performing information transmission and securing continuity, by switching the new light source in the 4 times state ($B_1 + B_2$) at the time of moving from ($B_1$) of the twice state to ($B_2$) of the twice state.

The light source restoration system is explained.

The line process of this non-contact connector (10) is divided into two, one is the new light source generation process, and other is the restoration process of the light source (11) from the new light source group of the above, that is, the light source restoration system.

Both can be considered as the application of the "light source catch and the capture switching" method.

Now, in the above, the switching-time light source was explained as the caught light source which can perform the capture switching from the switching source light source to the switching target light source in the specific angular position.

Conversely, except the specific angular position, this means having the characteristic of becoming the switching source light source or the switching target light source, and this can be said to be the light source which had the switching means for the channel switch in the inside.

Figure 8:
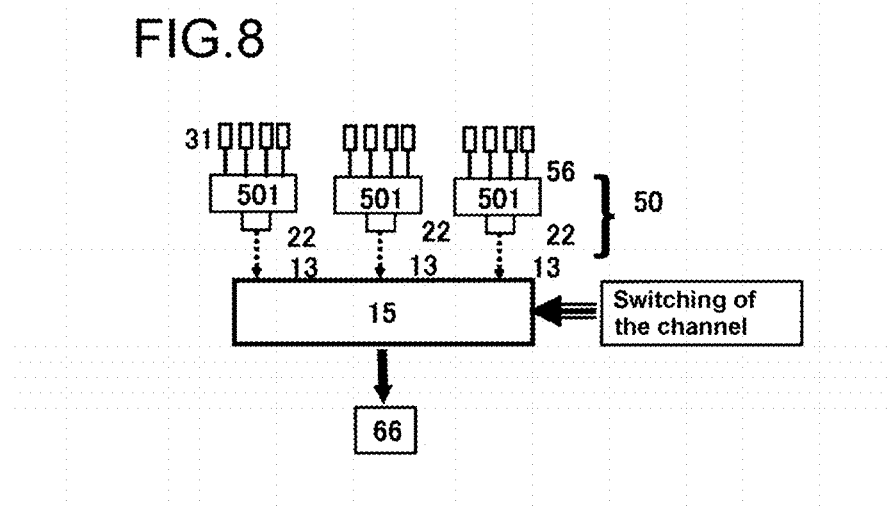
FIG. 8 is a configuration of a restoration system.

Therefore, the restoration process can be said the channel switch for the generation of the switching-time light source, and the switching-time light source, and becomes as shown in FIG. 8.

FIG. 8 shows the restoration system that the new light source (13) is generated by the optical coupling unit (50) from the light-receiving device (31) output, next, in the switching-time light source (15) which was constituted from an new light output device (22) output, the channel switch is performed, and the output to the exterior of the non-contact connector from the external output terminal (66) is performed.

The dashed line outputted from the new light output device (22) shows the optical output of the new light source, and the thick arrow outputted from the switching-time light source (15) to the external output terminal (66) means the light signal or the electric signal.

This restoration operation is performed in the new light source space which comprises the new light output device (22), the optical system (41), the new light-receiving device (32), and the external output terminal (66).

At this time, the structure in which the optical system (41) is installed separately from the new light output device (22) or the new light-receiving device (32), or the structure in which the new light output device (22) or the new light-receiving device (32) itself serves as the optical system, may be also good.

It can be said that the switching-time light source (15) in this light source restoration system has the following characteristic.

The switching-time light source is uniquely determined for every position of the light source, and since the switching source light source among them should be the caught light source at the time of the switching start, it is logic that the embodiment of the switching target light source can be determined uniquely.

Then, the embodiment determining method of this switching target light source is explained below.

At this time, the embodiment of the switching-time light source in the light source restoration system is examined as the embodiment of the sum of $(\beta+\alpha)$ of #2 (it is because #1 is obtained easily).

The switching-time light source of the new light source A was shown like the above-mentioned formula (4-3).

Then, since the switching source light source must be the caught light source, the embodiment is only two, (A2+A2+A3) having the central light source and (A1+A2).

It is because, in the case of the new light source A, the light source which can independently catch the light source is only the central light source (A2) as described above.

Since the switching-time light source of the new light source B is set to (B1+B2) from the above-mentioned formula (4-4), the switching source light source is set to the embodiment of (B1).

By this means, the switching target light source will be explained as the following embodiment.

The new light source A is explained as the embodiment of $(A_2+A_3+A_4)$ ($(A_1+A_2)$ is omitted), and the new light source B is explained as the embodiment of $(B_2)$.

The configuration method of the switching target light source in which the embodiment, was determined as mentioned above, is described below.

There are the following two kinds of the generation methods of the restoration light source of the new light source A and the new light source B.

When the specific light source (11), for example, the restoration light source of $LD_1$ is outputted to the external output terminal (66), ##1; the method that only the restoration light source of $LD_1$ is generated and the output to the external output terminal is performed, ##2; the method that the restoration light source of $LD_1$ is chosen out of the restoration light source of $LD_1$ and $LD_2$, and is switched, and is outputted to the external output terminal.

At this time, the restoration system of the method of ##1 is called "a restoration system on the rotator (80)", and the system of ##2 is called "a restoration system on the stator (90)."

The restoration system on the rotator (80) is explained.

The restoration system on the rotator means the circuit system which catches the light source (11) on the rotator (1) on the rotator, and restores.

This is equivalent to, what is called, the state of the relative motion of the two moving objects which run parallel to in the same speed, and if the light source is seen on the rotator, it will be in the state "in which the light source can be seen like stopping and the same light source, for example, the only $LD_1$ is seen"

Therefore, the caught light source (11) will be one specific one piece, for example, the only $LD_1$.

Next, the restoration system on the stator (90) is explained.

The restoration system on the stator is the circuit system which catches the new light source (13) by the POFC (51) etc. on the stator (2), and is composed.

At this time, if there are plural light sources (11), the capture switching is needed.

Now, in the above, although the communication system which goes from the rotating side to the fixed side is described, it goes without saying that the constitution by the new light source method of the communication system of the opposite direction can be also realized.

In the above, although the constructive method of the new light source product system and the light source restoration system has been individually described based on the new light source method, the circuit system constituted by combining them is classified into the systems to III here, and is explained.

These all can be said the configuration example of the switching-time light source (15) in the new light source space.

System I; the uni-direction communication system by "the new light source of the light signal", System II; the uni-direction communication system by "the new light source of the electric signal"; System III; the bidirectional circuit system.

Among these, system I is further classified into the circuit system of the following classification number #1 to #4.

The classification number #1; the restoration system on the rotator of the optical circuit by the light source selector The classification number #2; the restoration system on the stator of the electrical circuit line by the electrical switch The classification number #3; the restoration system on the stator of the optical circuit by the optical switch The classification number #4; the reverse circuit system of the restoration system on the stator of the electric circuit by the electrical switch For the restoration system shown in FIG. 8, "the circuit system which performs the light source restoration by applying the new light source A." is simply called the new light source A system, and "the circuit system which applies the new light source B" is simply called the new light source B system, and "the circuit system which applies the new light source C" is called the new light source C system, and "the circuit system by the new light source" is called the new light source system.

I The Circuit System by the New Light Source of the Light Signal

Four examples of "the circuit system by the new light source of the light signal" are explained in order of #1 to #4.

Classification Number #1 . . . (The New Light Source A System)

Classification number #1 shows the restoration system on the rotator (80) for the new light source A, that is, the new light source A system.

Figure 9:
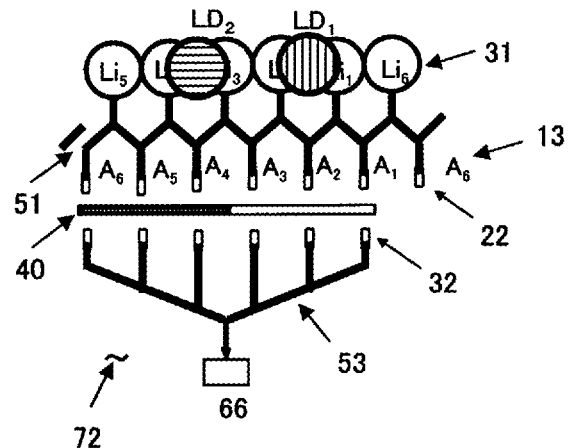
FIGS. 9(1) and 9(2) are configuration examples of a restoration system on a rotator.
Figure 9:
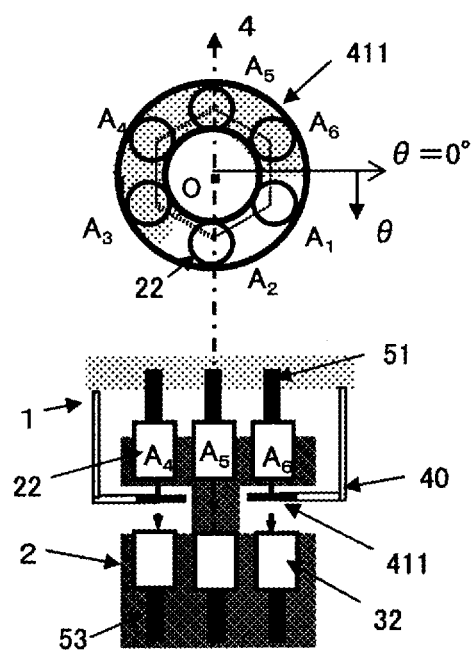

In FIG. 9(1), the entire structure of the circuit signal (7) is explained by the example of the new light source A system of the two channels.

The crossbar of the center of FIG. 9(1) shows a light source selector (40), and A1-A6 that are shown in the upper part is the same as the new light source output as FIG. 4(1).

Now, the drawing shows that the maximum of three new light sources are chosen in the optical system called the light source selector (40) for the new light sources A1-A6 developed to "the new light source space", and shows the new light source A system constituted by generating the new light source optical path towards 6×1POFC (53).

To constitute the stable optical path at the time of circuiting, the drawing shows the state that the new light output device (22) is equipped at the tip of the POFC (51) which outputs the new light sources $A_1$-$A_6$, and the new light-receiving device (32) is equipped at the tip of 6×1POFC (53).

FIG. 9(2) shows the structure and the function of the new light source A system which is shown in FIG. 9(1).

The upper figure of FIG. 9(2) shows the arrangement state of the attainment light source region (25) of the new light sources $A_1$-$A_6$, and the lower figure shows the side view of the range of 120 degrees from the center of circle O.

An optical system (41) of the light source selector (40) as been drawn as a disc-shaped light passage window (411) (described below).

First, the new light sources $A_1$ to $A_6$ shown in the upper figure of FIG. 9(2) are outputted from the new light output device (22), they passes through the optical path in new light source space, and they are described as the attainment light source regions $A_1, A_2 \ldots A_6$ on the acceptance surface of the new light-receiving device (32).

This is the same as the arrangement of the new light source in the new light source space shown in FIG. 7(1) (unlike FIG. 7(1), the reason which, in the drawing, the attainment light sources region aren't put in order without a space on circle O, is described below).

Here is in the state where the new light-receiving device (32) exists immediately under the attainment light source regions $A_1, A_2 \ldots A_6$ (the description is omitted).

Next, the lower figure of FIG. 9(2) shows the light path in the space of the new light source A system which goes from the new light output device (22) to the new light-receiving device (32).

As shown in the drawing, both the new light output device (22) and the new light-receiving device (32) exist above the stator (2), and the drawing shows the structures where the disc-shaped light passage window optical system (411) rotates in the inside of the space in which the new light output device (22) and the new light-receiving device (32) counter.

The light passing window (411) performs "passage" or "shade" operation for the light path in the space, while rotating.

The drawing shows the state of the equivalent deployment of $A_1, A_2 \ldots A_6$, and shows that the white portion and the hatching portions of the light passing window (411) correspond to the light passing section and the optical shade part, respectively.

Next, in FIG. 9(2), since the light path in the space propagates in the direction of the lower part in the surface of paper in parallel with the rotation axis (4), the positional relation of the attachment light source circle of the new light source and the light-receiving possible circle of the new light-receiving device becomes the same arrangement as FIGS. 2(1) to 2(3).

This shows that the geometric arrangement of the arrival circle of the light sources $A_1$ to $A_6$ on the acceptance surface of the new light-receiving device (32) and the light-receiving possible circle of the new light-receiving device (32), can be the same as the arrangement of the light-receiving device (31) and the light source (11) in FIGS. 2(1) to 2(3).

Therefore, FIGS. 9(1) and (2) show the new optical-communications system replaced the original light source (11) with the new light source $A_1, A_2 \ldots A_6$, that is, the space optical transmission system in the new light source space.

Next, the new light output device (22) is the optical function part in which the output light of the new light source (13) is optically formed by the built-in collimator etc. and the light signal is emitted, and can be treated like the above-mentioned light output device (21).

However, there is the case that the optical formation may not be required depending on in the new light source (13), and the new light output device (22) becomes the embodiment without the optical system in that case.

Next, the new light-receiving device (32) is installed in each light entry opening of a 3n×1POFC (53), and is the optical function part in which the light path in the space configuration is performed between the new light output device (22) and the new light-receiving device (32).

Now, the function of the restoration system on the rotator (80) is explained based on FIGS. 9(1) and 9(2).

First, for securing the interlocking property with the light source (11), the arrangement of the new light source (13) and the light passing window position are set up.

First, the new light output devices (22) of FIG. 9(2) are the same installation direction as the light-receiving devices $Li_1$ to $Li_6$ in FIG. 2(1) to FIG. 2(3), CW (clockwise rotation direction), and are installed in the same order of installation, $Li_1$ to $Li_6$ with the equivalent gap.

By these measures, the new light source optical path of $LD_1$ and $LD_2$ which goes from the new light output device (22) to the new light-receiving device (32) is constituted.

As mentioned above, the geometric arrangement of the new light sources $A_1$ to $A_6$ and the new light-receiving device (32), can be treated identically to the arrangement of the light source in FIGS. 2(1) to 2(3) and the light-receiving device.

As a result, the light source space of the light source (11) and the new light source space of the new light source (13) will be interlocked.

Now, the light source selector (40) is the structure body which has the optical system (41) rotating with the rotator (1).

This light source selector is the structure linking directly to the rotator (1), or the structure which is a part of the rotator, and the optical penetration window (411) which is showed in FIG. 9(2) is the optical system (41) installed in the middle of the optical path which goes to the new light-receiving device (32) from the new light output device (22), and the optical penetration window (411) is the optical structure in which the part of rotator structure has the optical passage function as the window structure and the part of the light source selector have the optical shade function as the light shielding board.

Also, as shown in FIG. 9(2), the new light-receiving device (32) and the new light output device (22) are installed face to face on the two circles which have the same diameter and are the concentric circles and are centered on the rotation axis (4), and since the optical penetration window (411) is installed on the rotator (1), the optical path which goes from the new light output device (22) to the new light-receiving device (32) configures the structure of the synchronous rotation with the rotator, that is, the restoration system on rotator (80).

Therefore, in the portion (white portion) of the light passing window of FIG. 9(2), so the light source light of $LD_1$ is input into the POFC (53), only the $LD_1$ light source is chosen, in the shading structure portion (hatching portions), the restoration light source is set only to the $LD_1$ by shading the input light which is the outputted light of $LD_2$ to the POFC (53) which is the outputted light of $LD_2$ (the case of the $LD_2$ is the same case).

This corresponds to the situation in which the light source selector (40) shown in FIG. 9(1) chooses only the light source corresponding to the width, and moves to right and left.

Thus, since the light passing window (411) becomes the selecting means of the restoration light source, it is called the light source selector (40).

The function of the light source selector (40) is "the generation of the switching-time light source and the implementation of the capture switching."

The capture switching by the light source selector with the pass window of 120 degrees width which is set up in order to avoid the signal mixing is explained below.

Now, although the switching-time light source (15) in the θ=60 degrees position is set to $(A_1+A_2+A_3+A_4)$ from the formula (4-3), it is $A_1=A_4=0$ at this time.

Therefore, when the rotator moves to the position (delta θ; extremely small angle) of the θ=(60+deltaθ)° from the θ=60 degrees position, since the light signal is not outputted from the new light sources $A_1$ and $A_4$, when the switching of the new light sources $A_1$ and $A_4$ in the portion of the end of the light passing window is performed, the problems, such as the discontinuous generating and the unclearness of the end part will not arise.

Therefore, it will be that the light passing window (411) can generate the switching-time light source $(A_1+A_2+A_3+A_4)$, and can perform the smooth capture switching in the θ=60 degrees.

By this means, the capture switching in this restoration system on the rotator (80) will become the switching operation called the switching of the new light source in which the quantity of light does not exist.

By this means, although the character of "switching" is attached to the capture switching, since the essence of this restoration system on the rotator can be the "always-on connection" instead of switching, the process of the higher speed signal can be realized.

Here, the installing method "with a space" for the new light output device (22) and the new light-receiving device (32) which is applied to FIGS. 9(1) and 9(2) is explained.

Now, although the light-receiving possible region (35) of FIGS. 2(1) to 2(3), or the attainment light source region (25) of FIG. 7(1) is arranged without a space on circle O and are drawn, on the other hand, the attainment light source region from the new light output device (22) in FIG. 9(2) isn't drawn to be arranged without space on circle O.

It is because that, the output light position of this new light source A is limited to the new light output device (22) of the POFC (51), it will not be in the state of existing successively on the circumference top like the light source (11) as described above, so there is no necessity of "putting the light-receiving region in order without a space."

It is because the object of "putting a light-receiving region in order without a space" in order is achieved by installing the luminescence opening of the new light output device (22) and the light-receiving opening of the new light-receiving device (32) in the contradiction position.

Originally the object that the attainment light source region of the light output device and the light-receiving possible region (35) of the light-receiving device putting are put in order without a space, is the geometric measure for sending and receiving without carrying out exfiltration of the light source, so it can be said that the attainment light source region or the light-receiving possible region need not to be put in order literally without space, because the exfiltration of the light source isn't carried out, even if the space less than one piece of the attainment light source region or the light-receiving possible region, exists.

The effect of the restoration system on the rotator (80) is explained.

In the restoration system on the rotator for the new light source A, the circuit system is constituted by performing the capture switching by the light source selector (40).

As for this, the new light source space is released from the restriction that the electric circuit part (210) in the fixed side is installed at the circumference of the rotation axis by the application of the 3n×1POFC for addition (53), although it is necessity that the new light source space is installed in the circumference of the rotation axis.

Since this restoration system on the rotator is "an optical circuit", the non-contact connector (10) can be used by combining "the optical circuit" with "the electric circuit", and it has the effect of the improvement in convenience.

Classification number #2 . . . (the new light source B system—the electric circuit), the classification number #2 shows the restoration system on the stator (90) of the electric circuit for the new light source B, that is, the new light source B system.

In this restoration system on the stator, the generation of the switching-time light source (15) and the capture switching which are shown in FIG. 8 are carried out by the electric signal.

Now, although the capture switching and the channel switch mean the same switching operation, while the former is the term from the switching operation called "the switching of the caught light source", the latter is the term from the operation of "the switching of the channel of the circuit signal."

That is, it is considered that the method of the capture switching is the method of the implement of the channel switching.

The structure and the function of the restoration system on the stator (90) for the new light source B are explained based on the configuration example shown in FIG. 10(1).

As clearly understood from the drawing, the component of this restoration system comprise three following parts, the communication light-receiving element (61) which are the conversion methods to the electric signal of the new light source B, the electrical switch (65) which is the electrical switch of the capture switching means, and the electrical circuits which is the output means to the external output terminal (66)

Now, as clearly understood by comparing FIG. 10(1) with FIG. 8, in FIG. 10(1), B1 to B3 in the drawing are the output of the new light source B, and the process from B1-B3 to the external output terminal (66) shows the restoration process which corresponds to the switching-time light source (15) in FIG. 8.

That is, the electrical circuit expressed as "the MBB type switching circuit (63) OR the MBB type adding circuit (64)" in FIG. 10(1) is equivalent to the generation circuit of the switching-time light source.

And the details of the switching-time light source (15) are clearly understood by comparing FIG. 10(2) with FIG. 10(1), the upper figure of FIG. 10(2) will become the embodiment of #1; ($\beta=\alpha$), and the lower figure will become the generation circuit of the switching-time light source (15) of the embodiment of #2; ($\beta+\alpha$).

Therefore, the output of the switching-time light source of FIG. 10(1) correctly turns into the output of the conduction circuit (631) of the upper figure of FIG. 10(2) or the adding circuit (641) of the lower figure.

Now, in the above, although FIG. 10(2) is explained from the viewpoint of the generation circuit of the switching-time light source, if it is seen from the functional viewpoint, it can be regarded as the capture switching circuit.

First, the configuration table of the capture switching circuit is shown in FIG. 10(3).

As for the circuit system (60) in the configuration table, the electric circuit system (62) is shown by this classification number #2, and the optical circuit system (72) is shown by the classification number #3, respectively.

Therefore, although the part for the optical circuit system in the table will be mentioned below, its part is written together previously.

Here, the capture switching circuit of an electric circuit system (62) is a MBB type switching circuit (63) and an adding circuit (64) which is shown in FIG. 10(2).

Also, an electrical switch (65) is the common-function part in a MBB type switching circuit (63) and the adding circuit (64), and in the MBB type adding circuit (64), only a conduction circuit (631) of the MBB type switching circuit (63) is replaced with an adding circuit (641).

The circuit system of FIG. 10(1), and the function and the structure of the capture switching circuit of FIG. 10(2), are explained using the above.

First, as shown in both drawings, the new light source B of $B_1$ and $B_2$ or similar shall be converted photo-electrically into $PD_1=B_1$, $PD_2=B_2$, and $PD_3=B_3$ by the communication light-receiving element (61).

Then, FIG. 10(1) shows that after the photoelectric conversion of the $B_1$-$B_3$ which is outputted from the new light output device (22), was carried out, based on the separately necessary channel switching information, the output is switched by electrical switch (65) $SW_1$-$SW_3$ in an MBB type switching circuit (63) or an MBB type adding circuit (64), and by the function and structure of an electric circuit system (62), the outputs is outputted to $Ch_1$ of the external output terminal (66).

At this tune, the structure which constitutes the light path in the space between the new light output device (22) and the communication light-receiving element (61) can be also realized.

Therefore, also in the case of this classification number #2, it is considered that the space optical transmission is carried out in the new light source space.

Now, the electrical switch (65) is the electrical switch for switching of electric signal, and is operated by a following MBB type switching operation order (70).

Here, since the "MBB type switching operation order" is also applied in the latter part as the switching operation procedure, The MBB type switching operation order (70) and the numerals are attached and the details are summarized below.

MBB Type Switching Operation Order (70) . . . Referring to FIG. 10(1) or FIG. 10(2)

As an example of the state of the $\theta=60$ degrees, the switching operation procedure of $SW_1$ to $SW_3$ is shown.

STEP 1, when 0 degree<the $\theta$<60 degrees
Only $SW_1$ is "on", and $SW_2$ and $SW_3$ is "off"
STEP2, when the $\theta=60$ degrees (the start state of the switching operation)
$SW_1$ keep on being "on", newly $SW_2$ change "on."
SW3 keeps on being "off."
STEP3, when the $\theta<60$ degrees (the termination state of the switching operation)
$SW_2$ keeps on being "on", $SW_1$ change "off."
$SW_3$ keeps on being "off."

Now, if, in the conduction circuit (631) of the upper figure of FIG. 10(2), it is regarded that the $PD_1$ is the switching source light source and $PD_2$ is the switching target light source, it can be said the operation electrical circuit of the formula (4-2-1).

Next, the lower figure of FIG. 10(2) is the operation circuit of the formula (4-4) which replaced the conduction circuit of the upper figure with an adding circuit (641), and the circuit has the function which generates the switching-time light source ($PD_1+PD_2$) electrically and has the function in which the electrical switch (65) performs the capture switching.

The output characteristics of the restoration light source $B_1$, $B_2$ and $B_3$ in the restoration system on the stator are explained.

If the restoration light source $B_1$ to $B_3$ (or $PD_1$ to $PD_3$) which should be connected to the terminal of the external output terminal $Ch_1$ or the terminal $Ch_2$ are chosen from FIG. 6, FIG. 11 is chosen.

That is, FIG. 11 means the channel switch table at the time of the channel switch. However, $Ch_1$ shows the channel number of the light source $LD_1$, $Ch_2$ shows the channel number of the light source $LD_2$.

Also, FIG. 11 shows that the embodiment of the switching-time light source is constituted as "the embodiment of #2; ($\beta+\alpha$)" which is described above (the case of the embodiment of #1; ($\beta=\alpha$) is omitted).

The viewpoint of FIG. 11 is explained.

In FIG. 11, the horizontal axis shows the external output signal (8) which should be on the external output terminal (66), that is, the output of this non-contact connector (10), and the vertical axis shows the rotation angle $\theta$ of the light source $LD_1$ of $Ch_1$ (the rotation angle of the light source of $Ch_2$ is added 180 degrees).

Therefore, for example, when $LD_1$ is in 0 degree≤$\theta$≤60 degrees, the new light source which is catching the light source $LD_1$ of the $Ch_1$ is understood if the rightmost top corner cell is seen, and it is shown that the inside of $B_1$ is obtained.

That is, it shows that $B_1$ (=$PD_1$) should be connected to the external output terminal $Ch_1$.

That is, FIG. 11 is the table in which the output light called $Ch_1$ is fixed, and the name of the new light source which catches the light source of $Ch_1$ is described.

Now, from FIG. 11, it is understood that the restoration light source which should be connected to the external output terminal $Ch_1$, is $B_1 \rightarrow (B_2+B_1) \rightarrow B_2 \rightarrow (B_3+B_2) \rightarrow B_3 \rightarrow \ldots$, and the $Ch_2$ has only the 180 degrees phase difference to the $Ch_1$.

It is acquired from FIG. 11 that the channel switch (capture switching) is also revealed every 120 degrees.

This reason of the revelation will become clear, if the lower figure of FIG. 4(2) is seen.

When the $LD_1$ is in the θ=0 degree, the light source $LD_1$ of the $Ch_1$ is caught to $B_1$, and in the θ=60 degrees position, $LD_1$ is still caught by $B_1$.

However, when $LD_1$ moves to the θ=120 degrees position. It is because $LD_1$ will be caught by B2.

That is, the reason of the emergence of the every 120 degrees is that the optical circuit structure peculiar to the new light source B where the group of the light-receiving device of $(Li_1+Li_2)$ and $(Li_3+Li_4)$ is emerged in the every 120 degrees.

Now, since the restoration system on the stator of the new light source B will constitute the circuit system for the switching-time light source of the two above-mentioned embodiments, it becomes the following two capture switchings.

(i) "the capture switching which starts at the θ=60 degrees and ends at the θ=120 degrees" the switching-time light source, the embodiment of the sum of #2 $\Rightarrow (B_1+B_2) = P_1$ (ii) "the capture switching which starts at the θ=90 degrees and ends at the θ=90 degrees", the switching-time light source; the embodiment of the conduction of #1 $\Rightarrow (B_1=B_2=P_1/2)$, the capture switching for the above switching-time light source (15) is examined.

Transmission Information in Switching-Time Light Source (15)

The mechanism of the signal characteristic transmission in the switching-time light source (15) from the information transmission switching source light source to the switching target light source is explained.

In 0 degrees≤θ<60 degrees, that is, in the position below 60 degrees, although the switching source light source $B_1$ is the caught light source of $LD_1$, the switching target light source $B_2$ is the caught light source of $LD_2$.

However, when the light source (11) reached the position of the θ=60 degrees, since the switching-time light source generated as $(B_1+B_2)$ is $B_2=0$, then $(B_1+B_2)=B_1$ is set, so the mixing signal does not go into the switching-time light source.

That is, at the θ=60 degrees, since both the switching source light source and the switching target light source turn into only $LD_1$ light source, the switching-time light source can be generated and the capture switching can be carried out.

That is, the capture switching for the switching-time light source (15) of the new light source B can be said to be the switching which carries out the information transmission and the light source catch, while being in the position where the mixing signal (in the above-mentioned case, $LD_2$ light source) does not enter into the switching-time light source.

Switching Timing and Switching Target

In the new light source B, the state of $B_1=0$ can be detected from the output of the communication light-receiving element (61) as the information that the quantity of the light is zero, that is, the quantity of the light doesn't exist.

This means that the distinction of "the quantity of the light is the zero state" and "the zero states of the digital signal in which the quantity of the light exists" (Manchester encoding etc.) can be made in the new light source B.

That is, if ""0" in the zero state of the quantity of the light" can be distinguished from ""0" in the zero state of the digital signal", the capture switching timing can be obtained during the employment of this non-contact connector (10) without obstructing the original circuiting, by detecting one "0" from the output of the communication light-receiving element (61) connected to the caught light source $B_1$, $B_2$, and $B_3$.

In this case, it can be said that the restoration system on the stator (90) of the new light source B has "the built-in switching timing information output machine."

Selection of Switching Target Light Source

The selection of the switching target light source explained here can be easily performed, if the channel switching information of the above-mentioned "the quantity of the light is zero "0" state" is applicable.

It is because the communication light-receiving element (61) itself in which the output was set to "0" will be considered the switching target light source if this information is applicable.

By this means, the switching target light source which is outputted to the external output terminal (66) using FIG. 11 can be selected as the following.

In both $Ch_1$ and $Ch_2$, CW; $(B_1) \Rightarrow (B_1+B_2) \Rightarrow (B_2) \Rightarrow (B_2+B_3) \Rightarrow (B_3) \Rightarrow (B_3+B_1) \Rightarrow (B_1) \Rightarrow \ldots$, CCW; $(B_3) \Rightarrow (B_3+B_2) \Rightarrow (B_2) \Rightarrow (B_2+B_1) \Rightarrow (B_1) \Rightarrow (B_1+B_3) \Rightarrow (B_3) \Rightarrow \ldots$ for example, when the initial position (at the time of starting position) of 0 degree≤θ≤60 degrees is acquired, since it turns out that the switching source light source outputted to the external output terminal of $Ch_1$ is $B_1$, when the switching information is newly acquired, $B_2$ is made the switching-time light source which is the switching target light source, that is, it shows the above-mentioned $(B_1) \Rightarrow (B_1+B_2)$ is applied.

Next, when the number of light sources (11) is the odd n, not only the new light source (13) like $B_1$-$B_3$ which are generated from the 2×1POFC (51) but also the 1×1POFC (55), that is, the output of the independent light-receiving device (31) may newly be introduced as a single new light source (131), and the one-channel system may be constituted, and it may be treated as follows.

n channel=(n−1) channel+one channel, by this means, it can be also treated the restoration system in the case of arbitrary n channels.

The Classification Number #3 . . . (The Restoration System on the Stator—The Optical Circuit)

The classification number #3 shows the restoration system on the stator (90) of the optical circuit for the new light source B and the new light source C.

In this restoration system on the stator, the generation of the switching-time light source (15) and the capture switching which are shown in FIG. 8 are carried out by the light signal.

That is, it is the circuit system which performs the light source restoration by the application of the optical switch (75) into the light path in the space constituted in the new light source space.

Figure 12:
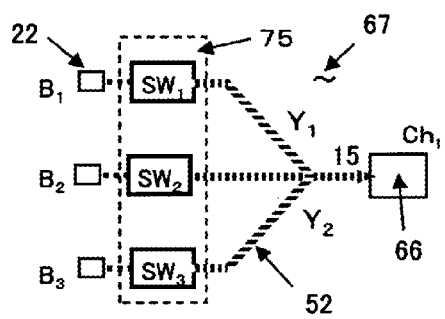
FIGS. 12(1) to 12(7) are configuration examples of a restoration system on a stator of an optical circuit.
Figure 12:
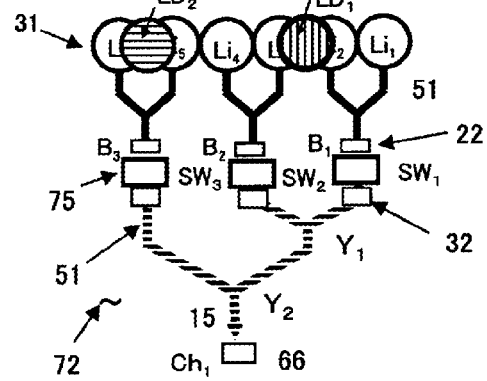
Figure 12:
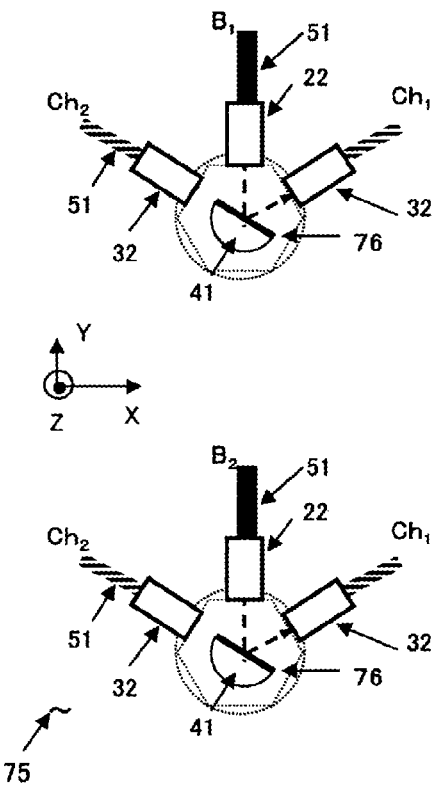
Figure 12:
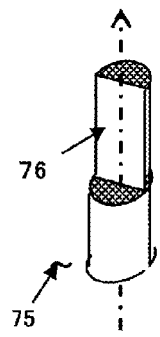
Figure 12:
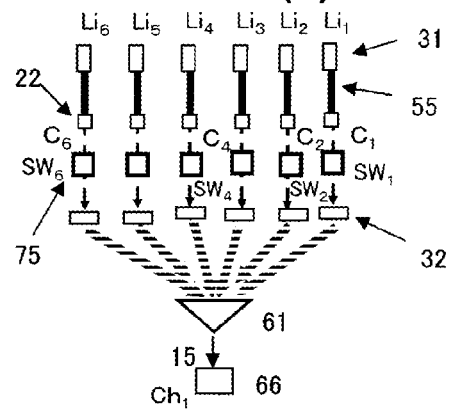
Figure 12:
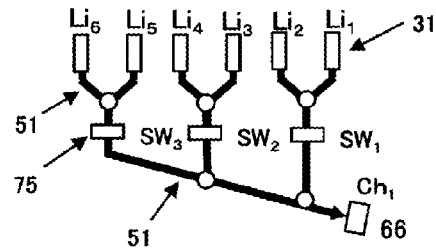
Figure 12:
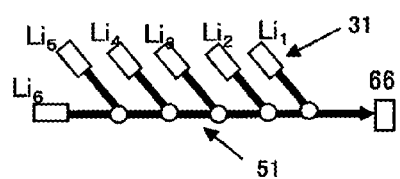

Now, although this circuit system includes the optical coupling unit (50), an optical switch (75), the new light-receiving device (32), and the external output terminal (66), etc., the optical switch (75) may be put side by side with the optical system (41) or may be replaced with the optical system (41), First, the generated light circuit of the switching-time light source (15) is shown in FIG. 12(1).

FIG. 12(1) shows the MBB type optical circuit (67) in which the light path in the space is constituted between $B_1$-$B_3$ and 3×1POFC for a light source restoration (52) which combines the input light quantity of the three pieces of lights and is installed to counter the new light output device (22) emitting the new light source, and the light path is switched by the optical switch (75) $SW_1$-$SW_3$ installed into the optical path, and outputs the light to the external output terminal (66).

Here, the installed position and its operation procedure of the optical switch (75) $SW_1$-$SW_3$ becomes the same as that of the case of the electrical switch (65) of the above-mentioned FIG. 10(2).

At this time, in the MBB type switching operation order (70), it is good that "ON" should just corresponds to $SW_1$-$SW_3$ of the "quantity-of-light input light" state, and "OFF" should just correspond to the "quantity-of-light non input-light" state.

The optical path of the striped pattern which leads to the external output terminal (66) after passing the optical switch (75) $SW_1$-$SW_3$ in FIG. 12(1), shows the optical path (it is abbreviated the POFC optical path) passing through the inside of POFC, or the light path in the space.

The configuration example of the optical circuit system (72) of the two channels is shown in FIG. 12(2).

If the drawing is compared with FIG. 8, clearly $B_1$-$B_3$ in the drawing are the output from the optical coupling unit (50), and the drawing shows that the restoration process in which the process of resulting into the external output terminal (66) from the new light output device (22) is equivalent to the generation of the switching-time light source (15) and the channel switch in FIG. 8.

That is, it is the circuit process (or line process) that after installing $SW_1$-$SW_3$ in the three new light sources respectively, by the 2×1POFC for restoration (51), the switching-time light source ($B_1$+B2) is generated and is outputted to the external output terminal (66).

At this time, it goes without saying that that this circuit process can be also constituted from the 3×1POFC (52) as shown in FIG. 12(1).

Next, although the optical path of the striped pattern of FIG. 12(2) also means the same optical path structure as FIG. 12(1), this is explained by the example of the θ=90 degrees state of FIG. 12(2).

In this state, since $LD_1$ is outputted to $B_1$ and $B_2$, the circuit system of $Ch_1$ will make $SW_1$ and $SW_2$ "on" and will make $SW_3$ "off."

When using the 2×1POFC (51) at this time, $B_1$ and B2 will be joined together and output by the 2×1POFC to which is attached the numerals of $Y_1$.

On the other hand, the two light signals of $B_1$ and $B_2$, can be simultaneously received by the communication light-receiving element (61), and ($B_1$+$B_2$) can also be obtained.

That is, it is possible that the addition operation of the photo detector substitutes the joint operation of $Y_1$ instead of POFC (the case of $Y_2$ is also the same case).

This means that it is also possible to make the striped optical path into any of the POFC optical path or the light path in the space.

By this means, it can be said that the POFC shown in FIG. 12(1) and FIG. 12(2) may become the addition by the communication light-receiving element (61).

The optical switch (75) operated in the new light source space is shown in FIG. 12(3).

The optical path switching function of the optical switch (75) of FIG. 12(2) is realized by the optical mechanism in which the reflecting mirror is driven mechanically, that is, by the mechanical drive mirror.

Although only $B_1$ and $B_2$ are drawn on the drawing as the new light source, since $B_3$ is also the same structure, it is omitted.

Now, the drive plane mirror switch of FIG. 12(3) is installed in the position of the optical switch (75) of FIG. 12(1) and FIG. 12(2).

As shown in FIG. 12(3), the two rotary positions are established in a plane mirror (76), one actuated position is made the $Ch_1$ output, other position are made the $Ch_2$ output, and it should just be considered that switching the actuated position of this plane mirror is performed by $SW_1$-$SW_3$ of FIG. 12(2).

Now, since FIG. 12(3) shows the rotating-type optical system of the plane reflecting mirror, the optical system (41) in the drawing is made into the mechanism rotated in the circumference of the Z-axis (perpendicular to space).

Therefore, the optical path is constituted in the XY plane (the inside of the surface of the paper).

The upper figure of FIG. 12(3) is in the state which the emitting light from the new light output device (22) which outputs $B_1$ is reflected with the plane mirror and is input into the new light-receiving device (32) of $Ch_1$.

Next, when the information on the channel switch start is received, the procedure is that the prescribed angle drive of the plane mirror for $B_2$ of the lower figure is carried out, and the output light of $B_2$ is reflected by the plane mirror and is input into the new light-receiving device (32) of $Ch_1$, and the addition of the light signal of ($B_1$+$B_2$) is performed (the case of $B_2$ and $B_3$ are also the same procedure).

The optical path of the striped pattern of the output side of the new light-receiving device (32) means the POFC optical path or the light path in the space.

Now, although the new light output device (22) and the new light-receiving device (32) are drawn in the input/output position of the optical switch (75), respectively, but it may be good that it isn't realized.

The important point is that the drive of the plane mirror for the above-mentioned B2 is carried out in the state (the quantity of the input light is zero) of $B_2$=0, by this means, FIG. 12(3) will be the channel switch machine in which the loss of the light-receiving light quantity does not generate.

Although the plane mirror for the communication system of the two channels is needed for three pieces correspond to $B_1$-$B_3$, and they interlock mutually and are driven, but only the two angular positions may be performed.

By this means, the step motor and the ON-OFF drive mechanism of the binary system may be sufficient as the plane mirror drive mechanism, so it can be simplified.

And, at this time, the operation procedure of the plane mirror described above becomes the MBB type switching operation order (70).

Next, the section including the rotation axis of the step motor etc. is processed into the plane mirror (76) as shown in FIG. 12(4), the above-mentioned plane mirror will also become the simple structure of the optical system.

Finally it is also possible that after constituting FIG. 12(2) as the "the optical circuit system", the light signal which is the output of the "the optical circuit system", is changed into the electric signal by the communication light-receiving element (61) in the final stage, so "the electric circuit system" is realized.

The electric circuit system (it is abbreviated with a final stage electric circuit system) which is changed into "electric circuit system" in this final stage is compared with that of the classification number #2 of the preceding paragraph.

In the preceding paragraph, once the light signal was changed into the electric signal by the communication light-receiving element (61), then the channel switch was performed, on the other hand, in this final stage electric circuit system, it is carrying out in the state of the light signal.

This difference appears in the number of the photo detectors, and since the photo detector is usually expensive, this final stage is more advantageous than the preceding stage, because the circuit system of this final stage electric has few required numbers of the photo detector.

Next, the optical circuit system for the new light source C is explained.

Although the configuration example is shown in FIG. 12(5), it is considered as one thing of the object that the existence position of the light source (11) is moved to the new light output device (22) position on the same stator (2) from the light-receiving device (31) position, so the restoration system is constituted.

Although the drawing is constituted based on FIG. 8, the new light sources $C_1$-$C_6$ are generated from the single output of the light-receiving devices $Li_1$-$Li_6$, and the drawing shows the circuit system which applied the mechanism similar with FIG. 12(3) to the optical switch (75).

And although the optical path of the striped pattern of the output side of the new light-receiving device (32), can also be considered as any of the POFC optical path or the light path in the space, the structure in which the light is input into the communication light-receiving element (61) as the latter space light path is shown in the drawing.

Now, FIG. 12(5) shows the constitution which installed the optical switch (75) in all the six new light sources $C_1$-$C_6$.

This is the constructional example in the case of constituting the circuit system of the maximum channel (four channels) which can be constituted for the six light-receiving devices (refer to classification number #4 and FIG. 17).

However, for example, in the case that the two-channel system is constituted for the six same light-receiving devices, as shown in FIG. 12(2), since the three new light sources may be set up, the new three light sources may be generated from the new light source C, and the optical switch (75) may be installed.

By this means, for the two-channel system, the optical switch (75) can be reduced to three pieces.

Now, although the optical paths of the striped pattern of FIG. 12(5) have been drawn so that the six optical paths are input into the communication light-receiving element (61) simultaneously, it can be constituted by decomposing into two optical paths, as shown in FIG. 12(2).

Therefore, it may be good that the generation of three new light sources is performed by the optical switch (75) which is showed in FIG. 12(3) or the optical switch which is given the optical function, such as a lens, instead of the POFC as shown in FIG. 12(2), so the circuit system is constituted.

However, in the case of the one-channel system without the optical switch (75), it may be good that the optical function, such as a lens, are given to each of the new light output device (22) and the new light-receiving device (32), so the new light source is generated.

Now, although the example which the six or the three new light sources are generated from the six light-receiving device outputs, so the circuit system is constituted, was described, for the new light source C, it is extensible to the circuit system which generates the n new light sources (n is an integer and N>n) from the N light-receiving devices (N is integer) and constitutes the circuit system.

Although the example of the application of the communication light-receiving element (61) is shown in FIG. 12(5), the light-receiving device material output by the light signal, can be installed in the position of the communication light-receiving element, so the optical circuit system can also be constituted.

The effect of the "stator restoration system—light circuit" is explained.

The effect of the optical circuit system which applied the optical switch (75) to the restoration system on the stator (90), exists in the point that the setting position of the optical switch (75) is released from the restriction that the position is the circumference of the rotation axis (4) like the light source selector (40) of the restoration system on the rotator (80).

Since the required number of the communication light-receiving element (61) can also be reduced than the case where an electrical switch (65) is applied, as described above, it is effective that the required number is the minimum number (the now case is the two pieces) of the same number as the case of the restoration system on the rotator (80).

And, since the "stator restoration system—the optical circuit" enables the construction of the optical circuit system for the new light source B and the new light source C, by this means, it is effective in enabling the construction of the optical circuit system for all of the new light sources A to the new light sources C.

The two common characteristics in the new light source circuit system of the classification number #1 to #3 are explained.

One is the characteristic about the diameter of the light source and the diameter light-receiving.

The circuit system of FIG. 12(2) will be simplified and become FIG. 12(6).

The three optical switches (75) of FIG. 12(6) are altogether made into "on", and if all the light-receiving device outputs of six pieces are made independent and are formed into the one-channel system, it can be shown as FIG. 12(7).

At this time, the quantity (number) of the optical circuit shown in FIG. 12(7), FIG. 12(6), and FIG. 12(2) is counted using the 2×1POFC as the one unit.

Therefore, a white circle (○) is attached to the joint action part of the 2×1POFC (since FIG. 12(2) is equivalent to FIG. 12(6), the white circle is not attached).

Then, all are five pieces.

Since the number of this white circles is equal to the number of 2×1POFC (51), both the numbers of the constitution can be said the five pieces.

Now, for the light-receiving device of this N=6, the relation that the constitution of the circuit system is realized by the five pieces of 2×1POFC can be said not only in this example but also in general cases.

This generality is explained using FIG. 12(7).

In FIG. 12(7), since all of the light-receiving device output of the six pieces of $Li_1$ to $Li_6$ are connected to the 2×1POFC, the white circle (○) corresponds to each 2×1POFC respectively.

However, both only two of $Li_6$ and $Li_5$ in the drawing, are input to one 2×1POFC and are sharing the white circle.

Therefore, in the number of the light-receiving devices, one white circle will decrease, and in response to it, in the required number of 2×1POFC, one 2×1POFC also always decreases.

Therefore, in the case of the arbitrary N pieces of light-receiving devices of $Li_1$ to $Li_N$, since it is only that $Li_6$ is changed into $Li_N$, it can similarly be said to be the above.

On the other hand, if the optical switch is added to FIG. 12(7) and the operation condition of the switch is set up, since it can return to FIG. 12(6), as the one-channel system, FIG. 12(7) can be said to be equivalent to FIG. 12(6).

If the white circle of FIG. 12(7) is centralized on one point, since it will be set to the 6×1POFC of FIG. 2(6). It can be said that the 6×1POFC can be constituted from the five 2×1POFC It can be considered that the circuit system for the new light source C of FIG. 12(5) is the big 6×1POFC constituted from the six light-receiving devices (31) and the one communication light-receiving element (61).

Therefore, it may be said that the circuit system of FIG. 12(5) can be also constituted from the five 2×1POFC.

In summary, It can be said that the circuit systems for the new light source B and C which comprises N light-receiving devices can be constituted by the 2×1POFC (51) of (N−1) pieces.

This can be because the circuit system of FIG. 12(2) and FIG. 12(5) is constituted based on the formula (1) and the formula (2).

And the formula (1) and (2) mean the common condition for the circuit system constituted under the geometric-relation of the attachment light source circle (diameter)≤the light-receiving possible circle (diameter) between the diameter of the light source and the diameter of the light-receiving, that is, between the attachment light source circle (25) and the light-receiving possible circle (35).

Other one is the two times space transmission characteristic of the circuit system by the new light source method.

That is, the circuit systems by the new light source method of the classification number #1, #2, and #3 have the characteristic of performing the space transmission in the both sides of the light source space and the new light source space.

This means that the new light source space can be constituted in the position different from the light source space, that is, the migration of the light source can be performed and it can be the indispensable characteristic for narrowly forming in diameter of the non-contact connector (10) etc.

Classification Number #4 . . . (The Reverse Circuit System)

The classification number #4 shows the reverse circuit system of the restoration system on the stator (90) for the new light source B and the new light source C.

Here, the reverse circuit system is the circuit system which is constituted in the light source space by changing the new light source (13) into the light emitting element for the rotator and by changing the light source (11) located in the rotating side into the light emitting element of the reverse function.

Now, in the light source space, the circuit system which puts the light emitting element on the rotating side is called a forward direction circuit system (abbreviated to the forward direction system), and the circuit system which puts the light emitting element on the fixed side is called a opposite direction circuit system (abbreviated to the reverse circuit system).

In both, although the configuration targets are the circuit system of the n channel, they are described together.

The forward direction circuit system; it is the system lined by the light path in the space turned from n light output devices in the rotating side to N light-receiving devices in the fixed side.

The opposite direction circuit system; it is the system circuited (or lined) by the light path in the space turned from N light output devices in the fixed side to n light-receiving devices in the rotating side.

Now, there is the two "light sources which output the light act to the space", in the stator side, when the circuit system is constituted.

One is the new light source (13) (the optical path from the stator to the stator) which constitute the optical path in the "new light source space" like the above-mentioned circuit system of the classification number #1 to #3.

Other one is the light source (the optical path from the stator to the rotator) which constitutes the optical path in the "light source space" and emits the light from the light-receiving device (31).

This classification number #4 becomes the latter.

First, the reverse circuit system constituted from the new light source B is explained.

When the new light source B system was made into the two-channel system now, the new light source is the three of $B_1$ to $B_3$, and the output characteristic on the plane on which the attainment light source region (25) is arranged without a space became the above-mentioned FIG. 7(2).

Then, now, conversely using the 2×1POFC (51) for the generation of the new light source B, the attainment light source region (25) shown in FIG. 7(2) is generated on the acceptance surface position of a rotating-side light-receiving device (33) installed on the rotator (1) by adjusting the optical system and the optical path length, etc.

That is, by using the 1×2POFC (51), each 120 degrees angle range of $B_1$ to $B_3$ in FIG. 7(2) is obtained.

Figure 13:
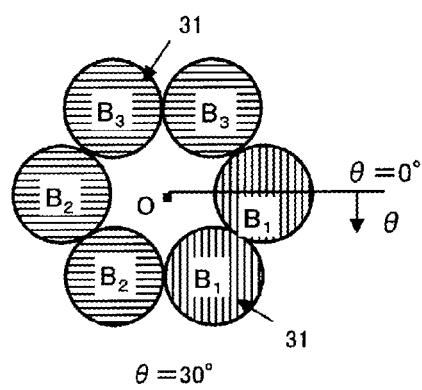
FIGS. 13(1) to 13(6) are configurations of a reverse circuit system.
Figure 13:
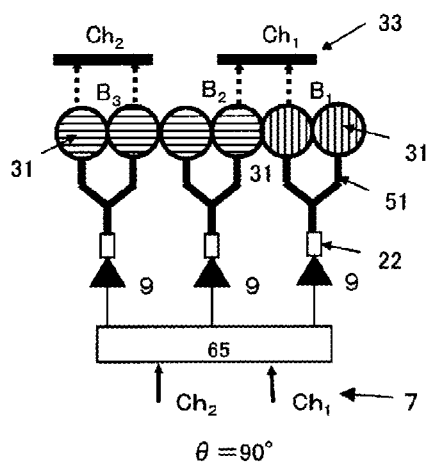
Figure 13:
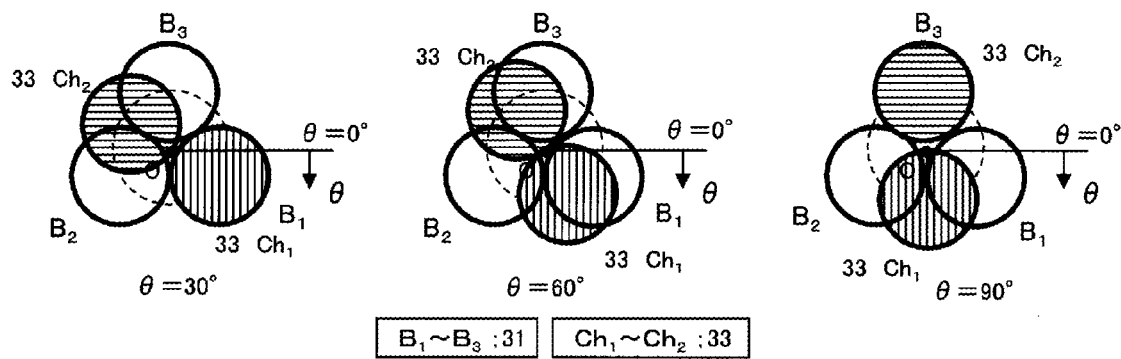
Figure 13:
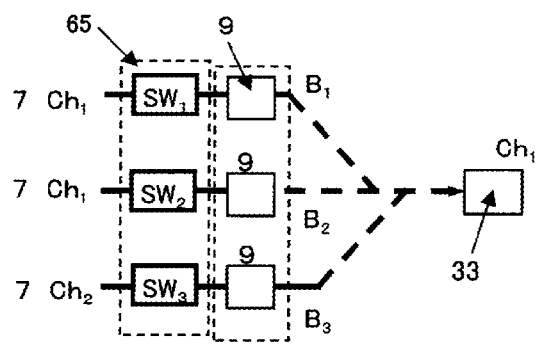
Figure 13:
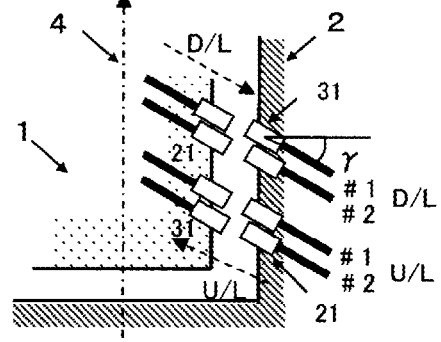
Figure 13:
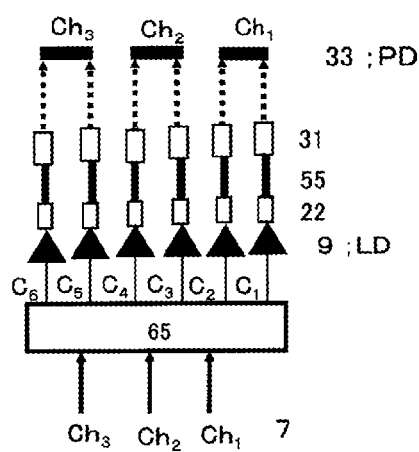

Then, the attainment light source region (25) outputted from this 1×2POFC (51) be in the state shown in FIG. 13(1).

That is, the 120 degrees angle range of $B_1$ to $B_3$ of FIG. 7(2) will be in the state comprising the attainment light source region (25) with the two 60 degrees angle ranges.

Then, since the 2×1POFC (51) will be applied as the 1×2POFC (51) of the opposite direction, the reverse circuit system constituted using the new light source B becomes FIG. 13(2).

Now, the 1×2POFC of FIG. 13(2) is applied so that the input output behavioral characteristic of the light may become structurally, functionally, reverse of that of the 2×1POFC shown in the lower figure of FIGS. 4(1) to 4(3).

Here, the lower figure in FIGS. 4(1) to 4(3) showed the state where the attachment light source circle from $LD_1$ and $LD_2$ in the rotating side, existed on the acceptance surface of the light-receiving devices $Li_1$ to $Li_6$ which are in the fixed side as described above.

On the other hand, FIG. 13(2) shows the situation where the output light (the light path in the space) denoted by the dashed line from the light-receiving device (31) constitutes the attachment light source circle in the position of the thick line (the breadth length of this thick line corresponds to the light-receiving possible circle diameter) showing the rotating-side light-receiving device (33).

If the light-receiving device (31) is seen from the fixed side, since it can be said that the light-receiving device (31) is the light output device at this time, it is called "the output light from the light-receiving device (31)."

Although, in the actual condition, it should be considered as the light output device, in order to describe "the opposite direction employment of the light-receiving device", the light-receiving device (31) is left as it is.

On the other hand, as a light-receiving function part, it is classified as the rotating-side light-receiving device (33).

When FIG. 13(2) is operating, the state where the attachment light source circle from the light sources $B_1$ to $B_3$ is constituted without a space on the acceptance surface of the rotating-side light-receiving device (33) is shown in FIG. 13(3).

The drawing show the situation that the size of the attachment light source circle white circle) of $B_1$ to $B_3$ and that of an light-receiving possible circle (striped pattern) are approximately the same size, the light-receiving device (31) $B_1$ to $B_3$ of the output side remains stationary, and the rotating-side light-receiving device (33) on the light-receiving side is rotating.

That is, since in the opposite direction system, "Putting the attainment light source region in order without a space is catching the light source, the opposite direction system is needed the geometric relation of "the region which can be the attainment light source region>=the light-receiving possible region" for the signal mixing evasion.

This becomes contrary to the above-mentioned relation of the forward direction system.

Now, although the "light sources $B_1$ to $B_3$" was described in the above-mentioned sentence, in the usage of the 2×1POFC (51) of the old forward direction system, they were "the new light sources $B_1$ to $B_3$" which is output from the I character section of the Y character shape.

On the other hand, in this usage, since these $B_1$ to $B_3$ are the input light from the I section (the position of the new light output device (22)) of the Y character shape of the 1×2POFC (51) in the drawing, they are called "the light sources $B_1$ to $B_3$", and are distinguished.

That is, since $B_1$ to $B_3$ becomes the light source which corresponds to $LD_1$ to $LD_2$ in the above-mentioned circuit system, they are described as the light sources $B_1$ to $B_3$ (it is classified by the existence of the character "new" from the new light sources $B_1$ to $B_3$).

Therefore, it can be said that FIGS. 13(2) and (3) shows the reverse circuit system constituted from the light source space light path which the signal light called light sources $B_1$ to $B_3$ on the fixed side is emitted from the light-receiving device (31), and is input into the rotating-side light-receiving device (33) on the rotator (1), and constitutes the light source space light source.

Now, in the reverse circuit system of FIG. 13(3), in order to obtain the output of $Ch_1$ from the rotating-side light-receiving device (33) of the vertically striped pattern, it is necessary to make the light source $B_1$ to $B_3$ synchronize with the rotation and switch.

That is, in the above-mentioned new light source B system of the forward direction, since on the light-receiving side, the channel switch was performed, the channel switch will be changed in the side of luminescence in this reverse circuit system.

Now, the configuration method of the circuit system of FIG. 13(2) is explained.

First, the switching-time light source of the opposite direction circuit system of FIG. 13(2) is the $(B_1+B_2)$.

This can be said the same as FIG. 12(1) of the forward direction circuit system.

Therefore, the generation circuit of the switching-time light source becomes FIG. 13(4).

That is, FIG. 13(4) are the detail views of the process by the electrical switch (65) and the light emitting element (9) in FIG. 13(2).

Both the light path in the spaces from the stator of FIGS. 13(2) and (4) to the rotator are shown by the dashed line.

Now, although the numerical formula of the switching-time light source of FIG. 13(4) and FIG. 12(1) is the same as that of $(B_1+B_2)$, there is a difference in the installed position of the switch.

In the reverse line like the above, since the channel switch will be performed in the luminescence side, it becomes the constitution that $SW_1$ to $SW_3$ in FIG. 12(1) moves to the preceding stage position of $B_1$ to $B_3$, and the circuit signal (7) is switched in the position of the electric signal.

Then, the switch for switching is replaced from the optical switch (75) of FIG. 12(1) to the electrical switch (65).

Next, FIG. 13(4) shows the addition situation of the space transmission light by the rotating-side light-receiving device (33).

The situation in which the light path in the space is input into the rotating-side light-receiving device (33), is shown by the light path in the space pass of the dashed line.

First, the $(B_1+B_2)$ is performed, next the $(B_2+B_3)$ is performed in this order.

In order to show it, FIG. 13(4) should not be the light-receiving situation map which condenses the light into one point in the photo detector (here the rotating-side light-receiving device (33)) as shown in FIG. 12(1).

This is because it may be described as shown in FIG. 13(4), or it may be described as shown in FIG. 12(1).

It is because the effect of the addition by one photo detector and the effect of composing by the POFC are same as described above.

Now, the bidirectional circuit system which comprises D/L (Down Link, the optical-communications system from the rotating side to the fixed side) and U/L (Up Link, the optical-communications system from the fixed side to the rotating side), shall be constituted combining the opposite direction system and the forward direction system which have been described above.

At this time, there are the two space light path structures in the light source space of this circuit system.

One is the structure (the parallel optical path structure) which arranges the light-receiving device (31) concentrically to the circumference of the rotation axis as shown in FIG. 9(2), and constitutes the optical path in parallel with the rotation axis (4).

Other is the tilted light path structure which is shown in FIG. 13(5), and this characteristic is the tilted light path structure in which each optical path is constituted at the angle $\gamma$ inclination to the plane right-angled to the rotation axis (4) or at the appropriately right angle as the $\gamma \approx 0$, and this characteristic can make the number of the light-receiving devices of D/L and U/L the same number, or the optical structure of the optical path the same structure.

The drawing shows the two bidirectional system in which the both sides of D/L and U/L are constituted from two optical paths, #1 and #2.

Now, the case where the forward direction system (FIG. 12(2)) of the new light source B is constituted in D/L, and an opposite direction system (FIG. 13(2)) is constituted in U/L, is taken for an example.

Although a bidirectional-communication system which shared the 2×1POFC (51) in the forward direction system and the opposite direction system can also be constituted by the parallel optical path structure at this time, In this case, since the apparatus for WDM (Wavelength Division Multiplexing), etc. are needed, there are the problems of cost and size.

On the other hand, when it is constituted without sharing it, since the number of the light-receiving devices of the forward direction system and the number of the light-receiving devices of the opposite direction system aren't the same number, the design of the circuit system suitable for each is needed for D/L and U/L separately.

However, if it is the tilted light path structure, even when not making the 2×1POFC shares, it can design by the same number of the light-receiving devices and the optical structure conditions.

Next, the configuration method of the reverse circuit system for the new light source C is explained.

The reverse circuit system of the three channels constituted as the embodiment which outputs the new light source C from the 1×1POFC (55) shown in FIG. 3(3), is shown in FIG. 13(6).

The structure of the circuit system is the same as that of the reverse circuit system for the new light source B shown in FIG. 13(2).

This may be regard as the circuit system which replaced 1×2POFC (51) of FIG. 13(2) with two 1×1POFC (55), and the new light source with new light source C.

Now, since the operation process of FIG. 13(6) is the three-channel system, first the input signal to the light emitting element (9) correspond to $Ch_1$, $Ch_2$ and $Ch_3$ of the circuit signal (7) will be generated by the electrical switch (65).

Next, the light signal of each channel generated by the light emitting element corresponding to the output from the electrical switch (65) is guided into the new light output device (22).

It is the process that the guided signal becomes the space transmission light from the light-receiving device (31), and is emitted into the rotating-side light-receiving device (33).

Now, the reverse circuit system which should be constituted for this new light source C is set to the circuit system of the maximum channel number (set to n) which comprises the light-receiving device output of N pieces.

This is because it can also respond to the constitution of the circuit system below the maximum channel number if the reverse circuit system of the maximum channel is obtained.

At this time, there is the following relation between the number N of light-receiving devices and the maximum channel numbers which can be constituted.

[Equation 17]

$$N = n + m \quad \text{[formula (9)]}$$
$$= n + m_1 + m_2, \text{ however } m = m_1 + m_2$$

Here, n is the maximum channel numbers of the constitution circuit system, m is the number of the "light-receiving device for the output adjustments" number, and it comprises the following $m_1$ and $m_2$.

$m_1$; the number of "the light-receiving devices (31) which output zero (0)" from $B_1$ to $B_3$ etc. for evading the signal mixing.

It is abbreviated to the number of zero output light-receiving devices.

$m_2$; the number of "the light-receiving devices (31) which outputs the circuit signal of the same channel number." from $B_1$ to $B_3$ etc.

It is abbreviated to the number of duplication light-receiving devices.

Now, the formation of the formula (9) is explained.

In the reverse circuit system, as the light resource outputted from one light-receiving device (31), there are only three kinds such as "the light source of the circuit signal (7) of the original", "the mixing light source which causes the signal mixing", and the "same light source as the light source of the circuit signal (7) of the original", and the number of each light sources in three kinds are n, $m_1$, and $m_2$ respectively.

And it can be said the optical circuit structure "one of the three kinds is outputted from one light-receiving device."

Therefore at the time of $N<n+m_1+m_2$, since it becomes the state which runs short of the number of the light-receiving devices to realize n, the constitution of the circuit system becomes impossible. Reversely if $N≥n+m_1+m_2$, the number of the light-receiving device will be in the redundant state.

Therefore, if there is n which satisfy $N=n+m_1+m_2$ in the formula (9), it is set greatest n which can constitute the circuit system, and it is also able to constitute the circuit system in the state where there are no excess and deficiency in the number of light-receiving devices.

By this means, m ($=m_1+m_2$) can be treated with "the number of the light-receiving devices for the adjustment to attain the greatest n."

Thus, if n for N is obtained, "the optical circuit structure of the maximum channel number n which comprises the light-receiving device output" will be uniquely determined.

This means that the circuit system of the maximum channel includes the circuit system of the channel number below n.

In other words, it will be said that "the optical circuit structure of the n channel which comprises the N light-receiving devices" and which constitutes the circuit system of the maximum channel number, does not change even if the channel number changes.

For example, at the time of N=6, the optical circuit structure of obtaining n=4 means the same structure also for the circuit system of 3 to 1 channel.

Then, although the n of the maximum channel number is sought based on the concrete example below, it will lead to seeking m.

It is because if m is known, n can be obtained from the formula (9).

First, the case of N=3 and n=2 (two-channel system) are examined.

Although this reverse circuit system is already shown in FIG. 13(3), if it is seen from the viewpoint of the abovementioned maximum channel system, for example, in the situation of the θ=30 degrees situation of FIG. 13(3), since $Ch_2$ should be outputted from both $B_2$ and $B_3$, it is set to number of the duplication light-receiving devices $m_2=1$.

In this situation, since it is $m_1=0$, it is set to $m_1+m_2=m=1$, so 3=2+1 will be formed.

Here, the reason used as $m_2=1$ is explained.

Since the light sources input to one rotating-side light-receiving device (33) is up to only two (because in the reverse circuit system; the attachment light source circle≥the light-receiving possible circle), If one of the light source is counted as "the light source as the light source of the circuit signal (7) of an original", and if others are counted as "the same light source of the circuit signal (7) of an original", it will become "one kind output from one light-receiving device", so, the excess and deficiency will be lost in the number of light-receiving devices.

This means that $m_2$ may be treated as "the number of the group of the duplication light-receiving device" (the case of $m_1$ is also same case).

Next, at the time of θ=60 degrees of FIG. 13(3), B2 will correspond to the "zero output light-receiving device", so it is set to $m_1=1$.

Since it is $m_2=0$ at this time, it is set to m=1.

The reason set to $B_2=0$ is clear seen from FIG. 13(3), in this time, since the output light from $B_2$ is input to the rotating-side light-receiving device (33) of $Ch_1$ and $Ch_2$ simultaneously. So if it isn't set to $B_2=0$, it is because the signal mixing occurs.

In summary in the case of N=3 and n=2, it will be always set to m=1.

Now in each rotary position, the circuit signal which should be outputted from $B_1$ to $B_3$ is summarized in FIG. 14.

As be clear seen from the table in the drawing, as the θ=30 degrees, when one of $B_1$ to $B_3$ comes right above the light-receiving device, it is set to $m_2=1$, and at the position more than above the light-receiving device like the position of the θ=60 degrees, it is set to $m_1=1$.

Therefore, in the case of N=3, since it is always set to m=1, it is set to n=2.

That is, in the case of N=3, since the signal mixing generates clearly in the reverse circuit system, the constitution isn't realized, so it is impossible to set n to 3.

Therefore, 2 becomes the maximum of n.

By the way. FIG. 14 becomes "the channel switch table of the reverse circuit system" corresponding to FIG. 11 (forward direction system).

FIG. 14 is the table used for following application, for example, to obtain the output of the $Ch_1$ in circuit signal (7) from the rotating-side light-receiving device (33) in FIG.

13(4), $SW_1$ to $SW_3$ are operated according to the table of FIG. 14, and the circuit signal of $Ch_1$ from the light source $B_1$ to $B_3$ may be outputted.

Next, the case of in N=6 and n=4 (the number of the rotating-side photo-detectors (33), the four channels of $Ch_1$ to $Ch_4$) is examined.

Figure 15:
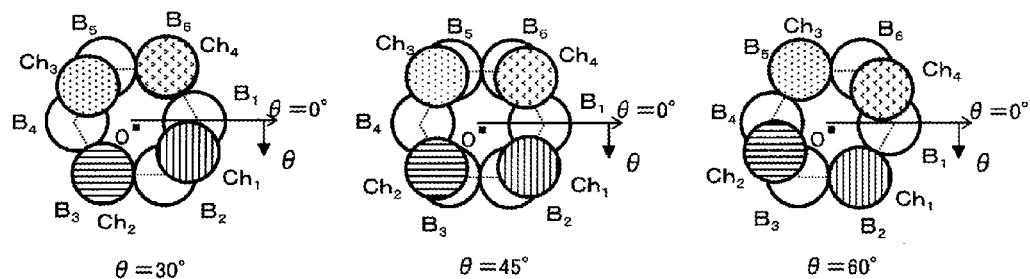
FIGS. 15(1) and 15(2) configuration examples of a reverse circuit system.
Figure 15:
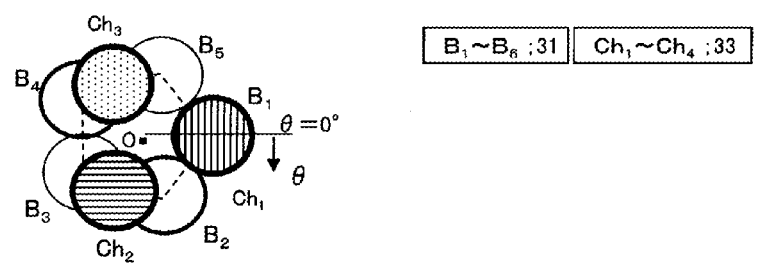

The circuit condition (or line condition) at this time is shown in FIG. 15(1).

However, in all FIGS. 15(1) and 15(2), the light-receiving device outputs of the six pieces are shown as $B_1$ to $B_6$ (it is for being classified against the light-receiving device output $Li_1$ to $Li_6$ in the case of the forward direction system shown in FIGS. 2(1) to 2(6)).

Also, all the drawings show the rotating-side light-receiving device (33) of $Ch_1$ to $Ch_4$ etc. on the light-receiving device (31) output of $B_1$ to $B_6$ etc. without the perspective as the case of FIG. 13(3) (since it will become complicated by the perspective).

FIG. 16 shows the channel switch table of the circuit signal which should be outputted from $B_1$ to $B_6$.

By basing on FIG. 15(1) and FIG. 16, the following channel switch rule can be obtained from the positional relation of the rotating-side light-receiving device (33) and the light-receiving device output $B_1$ to $B_6$.

In the right above position of θ=30 degrees or 60 degrees or similar; since the "zero output light-receiving device" does not exist, it is set to $m_1=0$ and $m_2=2$. In the position other than right above; since "the duplication light-receiving device" does not exist, it is set to $m_1=0$ and $m_2=2$. Therefore in this case, since it is can be said $m=m_1+m_2=2$ in the position of all angles, it is known that the circuit (or line) of the maximum of 4 channels is constituted.

On the contrary, if the above channel switch rules can be obtained, the channel switch table of the above-mentioned FIG. 14 or FIG. 16 etc. can be created.

Next, the case of N=5 and n=3 is shown in FIG. 15(2).

In the situation (the θ=0 degree) of FIG. 15(2), n=3 is set in N=5, since it is obvious that $m_1=0$ and $m_2=2$, it leads to m=2, so n=3 is the maximum.

That is, the circuit system of three channels is the maximum among the five light-receiving devices.

Now, in the case of N=4, it is also carried out similarly, and if the above-mentioned example is summarized, it will become as shown in FIG. 17.

"The relative position" in FIG. 17 means "the relative position of the light-receiving device output of $B_1$ to $B_4$ etc. and the rotating-side light-receiving device", "the right above" means "the position where the light-receiving device output of $B_1$ to $B_4$ etc. exists right above the light-receiving device", "the outside of right above" means "the position where the light-receiving device output of $B_1$ to $B_4$ etc. does not exist right above the light-receiving device", and "the total position" means "the arbitrary position."

Now, although the maximum of n among N=3, 4, 5, and 6 is shown in FIG. 17, N=8, 9, 10, 12, . . . , etc. are obtained by "a sequential extension system."

Here, "the sequential extension system" is explained using FIG. 15(1).

The reason that FIG. 15(1) is used is that the circuit system structure of N=6 has the constitution that is configured from the two sets of series configuration of the circuit system structure of N=3.

That is, the circuit system in the θ=30 degrees of FIG. 15(1) can be considered as the structure where the pattern that $B_3$ exists right above $Ch_2$ of the light-receiving device, and $B_4$ and $B_5$ exist ranging over $Ch_3$, is repeated.

That is, it is because it can be considered the structure where the above-mentioned "constitution from $B_3$ to $B_5$" is extended on the left side of $B_5$.

Therefore, for example, in the case of N=9, since it may be regarded as the structure which is the 3 sets of series of the "constitution from $B_3$ to $B_5$", n=6 (because, 2×3) becomes the circuit system of the maximum channel.

In the case of N=8, n=2×2=4, is the circuit system of the maximum channel.

Therefore, also when the number of light-receiving devices becomes large, the method (the one by one extension system) of extending the structure pattern shown in FIGS. 15(1) and 15(2) on the one circumference like the case of above N=6 or 8, may be taken.

The effect of the "reverse circuit system" is explained.

Compared with the opposite direction system of the electric circuit, since the operational amplifier for the addition becomes unnecessary, the low-pricing is realized.

In the forward direction system of the optical circuit, in the case of the two-channel system, it is necessary that the number of light emitting element is two and the number of the photo detector is three of $B_1$ to $B_3$. On the other hand, in FIG. 13(2) it is necessary that the number of light emitting element is three of $B_1$ to $B_3$, and the number of photo detector on the rotating-side is two. Since the expensive light-receiving elements are exchanged with the cheap light emitting element, so the low price is realized.

II Circuit System of Electric Ssignal by New Light Source

Until now, the output of the light-receiving device (31) is composed by the POFC, and the new light source A to C of the light signals are obtained, and the light source restoration system is constituted.

On the other hand, the output of the light-receiving device (31) isn't formed using POFC, but the new light source A to C of the electric signal can also be directly obtained using the communication light-receiving element (61).

Figure 18:
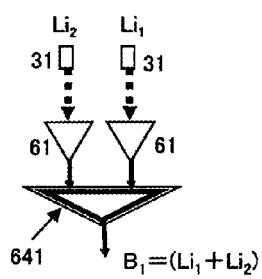
FIGS. 18(1) to 18(3) is an example of generation of a new light source of an electric signal.
Figure 18:
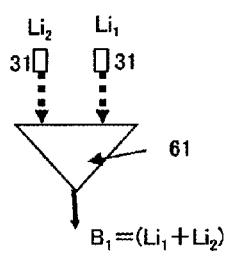
Figure 18:
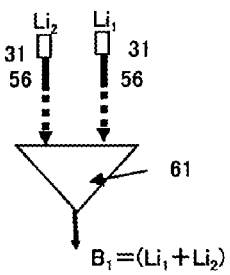

The example of the generation of the new light source B of the electric signal is shown in FIGS. 18(1) to 18(3).

The dashed line in the drawing showed the light path in the space, and $B_1$ is also shown as an example of the new light source.

FIG. 18(1) shows the configuration example that after the photoelectric conversion of each output of the light-receiving device ($Li_1$) and the light-receiving device ($Li_2$) by the communication light-receiving element (61), the new light source of the electric signal $(B_1)=(Li_1+Li_2)+B918$ is obtained using the adding circuit (641).

On the other hand, FIG. 18(2) shows the configuration example that the light signal output of the two light-receiving devices (31) is directly added by one communication light-receiving element (61), and the new light source of the electric signal output $(B_1)=(Li_1+Li_2)$, is obtained.

At this time, there is also the configuration method that the light-receiving device (31) output is guided into one communication light-receiving element (61) using an optical system (not shown).

Although the generation method of the new light source B was illustrated in FIGS. 18(1) to 18(3), in the case of the new light source A, if the light signal (the two split divergence light) which the light-receiving device (31) output is split, is made into the light source, it goes without saying that the new light source A of the electric signal output can be obtained. In the case of the new light source C, if the light-receiving device (31) output will be made into the light source as it is, it goes without saying the new light source C of the electric signal output can be obtained.

Now, although FIGS. 18(1) and (2) shows the constitution structure of the new light source which guides the light-receiving device (31) output to the communication light-receiving element (61) directly, as shown in FIG. 18(3), it can also be considered as the constitution structure of the new light source that the output from the POF (56) linked to the light-receiving device (31) shown in FIG. 2(4) link to the communication light-receiving element (61).

In this case, the configuration that the light-receiving device (31) output is guided into one communication light-receiving element (61) using the optical system (not shown), can be also realized.

In any case, the function to move the generated position of the new light source to another position from the light source space can also be added to "the new light source of the electric signal."

III Simultaneous Bidirectional Circuit System

The configuration method of the simultaneous bidirectional circuit system is explained.

The simultaneous bidirectional circuit system means the communication system which performs the circuiting for D/L and U/L simultaneously.

At this time, there are two systems in the simultaneous bidirectional circuit system, #(i) the bidirectional system using the new-light source B etc., and #(ii) the bidirectional system, using the bidirectional photonic device.

As an example of the two bidirectional system, #(i) and #(ii) are explained in order.

(i) The Simultaneous Bidirectional Circuit System Using the New Light Source B etc.

For example, this bidirectional circuit system is the following circuit system, only the light output device is installed on the one circumference by the side of rotation, the only the light receiving device is installed on the circumference of the same diameter on the fixed side, and the uni-direction system of D/L is constituted, Then, the uni-direction system of D/L is combined with the uni-direction system of U/L constituted on the concentric circle circumference, so the optical communication is simultaneously performed.

For example, the circuit system shown in FIG. 12(2) of the classification number #3 is set to D/L, and the circuit system of FIG. 13(2) of the classification number #4 is set to U/L, and the circuit system is the constitution which arranges them on the concentric circle of the different diameters.

Although the above was explained as the parallel optical path structure, also in the case of the tilted light way structure, it can constitute similarly.

(ii) Simultaneous Bidirectional Circuit System by Bidirectional Photonic Device When D/L or U/L is constituted, this system is the simultaneous bidirectional circuit system constituted by mixing and installing the light output device and the light-receiving device on the one circumference.

This simultaneous bidirectional circuit system is the following circuit system, first using the optical semiconductor device which can switch the luminescence function and the light-receiving function, the light output device and the light-receiving device are constituted, and they are mixed and installed on the circumference, and they are functionalized so that the uni-direction system itself may have hi-direction character, Next, the simultaneous-transmit-communication property and the bi-directional-communication property are obtained by constituting the bidirectional optical path between the rotator and the stator.

Now, if the semiconductor device which can switch the luminescence function and the light-receiving function are called a "bidirectional photonic device", and if the general term of the light output device (21) and the light-receiving device (31) is called a "light receiving/emitting device", the means to get the bidirectional performance will be the "application of the bidirectional photonic device", and the "the optimal arrangement of a light receiving/emitting device."

Figure 19:
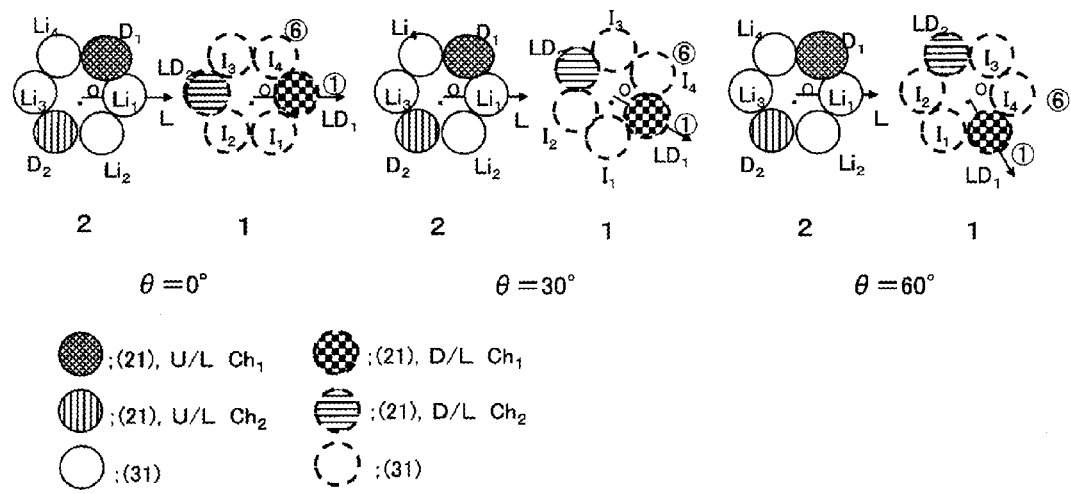
FIGS. 19(1) and 19(2) are the configuration examples of a simultaneous bidirectional circuit system (two channels).
Figure 19:
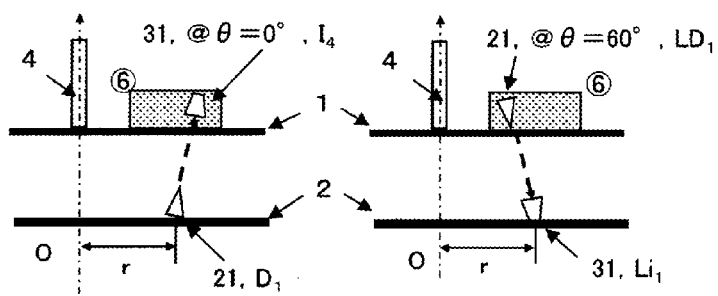

Now, although the two bidirectional system of this circuit system is shown in FIG. 19(1), the six small circles which are put in order without a space on the circle O show the light receiving/emitting device.

That is, the two light output devices (21) and the four light-receiving devices (31) are arranged so that they may be symmetrical to the rotation axis (4) respectively on the circle of the same diameter of the rotator side and the stator side as shown in the each drawing.

At this time, the simultaneous bidirectional circuiting is performed by the switching the function of the bidirectional photonic device which installed in the rotating side with the rotation, the light source catch is performed by the addition of the outputs of two light-receiving devices which adjoin on the rotating side and the fixed side.

Now, FIG. 19(1) shows the circuit condition in the three rotation angle positions (the $\theta$=0 degree, 30 degrees, and 60 degrees) of the light source LD1 on the side of the rotator, when the stator remains stationary, and the rotator is rotating.

At this time, the left figure of each drawing shows the arrangement state of the light receiving/emitting device on the stator (2), and the right figure shows the rotational state of the light receiving/emitting device on the rotator (1).

Although the counter installation of the light receiving/emitting device on the stator of the left figure and the light receiving/emitting device on the rotator of the right figure is carried out structurally, at the time of describing them, the right figure shows the state where the rotator in the countering state was made to slide to right-hand side, (that is, the right figure are the perspective diagrams from the back).

The conventional relational equation for the light sending-receiving unit is the formula (1), and although the 3n light-receiving device has been arranged for the n light sources, this reason is for the unidirectional circuit system construction.

Therefore, in order to acquire the bi-direction character in this constitution, the addition of the luminescence function element is needed for the light-receiving device side.

Then, the formula (1) is decomposed into 3n=(n+2n), and the constitution is changed into the constitution comprising n "light output devices" and 2n light-receiving device instead of 3n light-receiving device.

That is, the reason for "the three light-receiving devices for the one light output device" is the following. Since the two light-receiving devices were enough for the light source catch, the one light-receiving device turns into "the light-receiving device of the zero input" for preventing the signal mixing.

Then, this one "light output device" be equivalent to this "light-receiving device of the zero input."

Since it is the "light output device" and the same operation as "the light-receiving device of the zero input" is carried out, the substitution can be realized.

That is, it is the expansion from "the light-receiving device of the zero input" to "the light output device which the light is outputted into the counter direction."

By this means, the construction of the bidirectional circuit system will be the construction that the light sending-receiving unit which replaced the 3n light-receiving device with n "light output devices" and the 2n light-receiving device, is constituted from the bidirectional photonic device.

Then, the concrete example of the substitution of the above-mentioned light sending-receiving unit is shown.

The light sending-receiving unit on the stator at the θ=60 degrees of FIG. 2(2) and FIG. 19(1) is compared (the three of $Li_1$-$Li_3$ corresponding to LD1 in FIG. 2(2) are compared).

From both the drawings, it can be understood that $Li_1$ of FIGS. 2(1) to 2(6) corresponds to $Li_1$ of FIG. 19(1), $Li_2$ of FIGS. 2(1) to 2(6) corresponds to $Li_2$ of FIG. 19(1) and $Li_3$ of FIGS. 2(1) to 2(6) correspond to $D_2$ of FIG. 19(1).

Here, since $D_2$ is the light output device (22) of $Ch_2$ for U/L on the stator, it means that the three light-receiving devices of $Li_1$ to $Li_3$ are exchanged with one "light output device which emits the light to the counter direction" called $D_2$ and the two light-receiving devices of $Li_1$ to $Li_2$.

The simultaneous bidirectional performance constituted by the bidirectional photonic device (in the following, it is abbreviated to the photonic device) is explained.

First, the characteristic of the light sending-receiving unit in the side of the rotator of FIG. 19(1) is set up.

In the three angular positions, although the light sending-receiving unit on the rotator shown in the right figure does not have the luminescence function and the light-receiving function simultaneously, it is set up that the luminescence function and the light-receiving function are switchable.

On the other hand, the photonic device on the stator of the left figure is set up that the functional switch is not carried out in the state that the photonic device is fixed to the illustrated luminescence function and the light-receiving function (all the three angular positions are same position).

Next, as shown in the drawing, the 1st photonic device defined arbitrarily on the rotator is set to (i). The 6th photonic device is set to (vi). The rotation angle (→ for angle measurement is also attached in the photonic device position of (i)) of (i) which is measured on the basis of the circuit → (this arrow shows the 0 degrees position on the stator, and is called the stator 0 line L) on the stator is set to the θ.

Now, in the θ=0 degree, it is in the state in which $D_1$ is on $Li_1$, $LD_2$ is on $Li_3$, $D_1$ is on the $Li_4$ and $D_2$ is on $I_2$.

At this time, the input light into $Li_2$ and $Li_4$ and the input light into $I_1$ and $I_3$ are in the state of 0 (zero).

Next, in the θ=30 degrees, since $LD_1$ moves into both $Li_1$ and $Li_2$, and the output light from other light output devices also moves onto the two light-receiving devices respectively, and the each output light is caught each two light-receiving device, it is in the state that there is no light-receiving device which doesn't have the input light.

Now, from now, since the understanding of the operation situation is possible if only the state of representative light source $LD_1$ is followed up. The explain will be carry out paying attention to $LD_1$.

Now, if it will be in the θ=60 degrees state, $LD_1$ will move on $Li_2$, and the state where it was $Li_2$=0 at the θ=0 degree will change to the state of $Li_1$=0.

In the θ=the 0 degrees position, of course, (i) is in the 0 degree position from the stator 0 line L, and (vi) is in the 300 degrees position from the stator 0 line L.

Next, in the θ=60 degrees, the photonic device in the position of the stator 0 line L changes to (vi), reasonably (i) is rotating into the θ=60 degrees position.

Then, when (i) arrives at the θ=60 degrees, the photonic device (it was the light-receiving device $I_4$ until now) of (vi) is switched to the luminescence function which outputs ($LD_1$).

Then, both (i) and (vi) on the rotator will become the light output device ($LD_1$), and the state becomes the situation where the drawing of the rotator of the θ=60 degrees position in the rightmost figure and the drawing of the rotator of the θ=0 degrees position in the leftmost figure, were piled up.

That is, the photonic devices on the rotator in the position of 0 degree and 60 degrees from the stator 0 line L become $LD_1$ with the two luminescence functions.

And after this, if (i) is switched to the light-receiving function, it can be considered as the MBB type. Together with this, It will return into the θ=0 degree state.

The point of this MBB type switching formation is the point of becoming possible to switch the photonic device of (vi) to the light emitting function, when it becomes the θ=60 degrees position.

The reason for making it possible is for the constitution that "$LD_1$ is caught by ($Li_1$+$Li_2$)".

That is, it is because it is the constitution in which only light output device ($LD_1$) light is input into $Li_1$, and moreover $I_4$ is in the state of the input light zero before switching, so there is no (the signal mixing etc.) problem even if both are the light output device ($LD_1$) ($LD_2$ is caught by ($Li_3$+$Li_4$)).

Now, since the above was the circuit system (D/L) of the rotator the stator, although the operation situation of the circuit system (U/L) of the stator the rotator is explained next, it may be completely conclusively thought by the same way.

At the θ=0 degree, $D_1$ is caught only by $I_4$, and at the θ=30 degrees, it is caught by ($I_3$+$I_4$) and at the θ=60 degrees, it is caught only $I_3$.

By this means, the U/L should just have the constitution which catches the D1 by ($I_3$+$I_4$).

However when it becomes the θ=60 degrees, since the above-mentioned photonic device of (vi) (it was light-receiving device $I_4$ until now) will be switched to the luminescence function, it is good that ($I_3$+$I_4$) is constituted by switching $LD_2$ to the light-receiving device ($I_3$ in the θ=0 degree position) simultaneously with the switching.

Of course, since the ($I_3$+$I_4$) moves with the rotation, the state of FIG. 19(1) correctly becomes (the light-receiving device of the 300 degrees position and the light-receiving device of the 240 degrees position) from the stator 0 line L.

By the way, the capture of $D_2$ will be performed in ($I_1$+$I_2$), to the exact, in (the light-receiving device of 120 degrees position and the light-receiving device of the 60 degrees position) from the stator 0 line L.

Now, as mentioned above, after the functional switch implementation of the photonic device, the arrangement of the photonic device in the side on the rotator in the θ=60 degrees position, will return to the same arrangement, although the number of the photonic device is moving by one piece for the arrangement in the θ=0 degrees position.

This conclusively becomes "$LD_1$ merely moves between light-receiving device $Li_1$ and $Li_2$ on the fixed side."

As a result, $LD_1$ is always outputted from ($Li_1$+$Li_2$).

By the way, in the case of other light output device outputs, "$LD_2$ is moving between light-receiving device $Li_3$ and the light output device $Li_4$", and "$D_1$ is moving between the light-receiving device $I_4$ and the light output device $I_3$", and "$D_2$ is moving between light-receiving device $I_1$ and the light output device $L_2$."

That is, it may be said the circuit system which the migration of the photonic device caused when the rotator (1) moved from the θ=0 degrees position to 60 degrees position, is canceled by the functional switch of the photonic device.

It goes without saying that although the migration of the rotator (1) of the direction of CW was examined, the case of CCW can also be discussed similarly.

Also since the right and left of FIG. 19(1) are replaced, and the left can also be regarded as the rotator, and the right can also be regarded as the stator, the establishment that the photonic device capable of the functional switch can also be installed on the stator, can also be set to the contrary establishment to that of FIG. 19(1).

Counter Displacement of Photonic Device

The switchable photonic device which is on the rotator or the stator in FIG. 19(1), for example, is realized by installing the light-receiving device and the light output device closely, so by constituting the one pair photonic device which had both functions.

By this means, FIG. 19(1) is drawn as the state where the light output device and the light-receiving device on the side of the rotator are arranged on one circle O.

However, the example that the light output device and the light-receiving device of photonic device (vi) on the side of the rotation are arranged and separated on the two concentric circles, is shown in FIG. 19(2).

The figure shows the state of the functional switch in which the left figure come to have the light-receiving function called I4 in the θ=0 degree, and the right figure come to have the luminescence function called LD1 in the θ=60 degrees.

At this time, since the light output device ($D_1$) and the light-receiving device ($Li_1$) which was installed on the circle of the radius r on the stator will be in the state of the counter installation with (vi) respectively, the optical path constitution can be performed.

Moreover, although the installed position of the function switchable photonic device was shown as the two concentric circle in FIG. 19(2), it is good also as the two circle of the same diameter which is installed in the hierarchy form Multi Channel Simultaneous Bidirectional System At last, the method of the multi channelization of the simultaneous bidirectional system is explained.

First, regarding the simultaneous bidirectional system of #(i), only the number of the circle of the concentric circle (or the number of hierarchies) may be increased.

Next, in the configuration method of the simultaneous bidirectional line #(ii) system by the bidirectional photonic device, first the configuration method of a one-channel system is seen.

Figure 20:
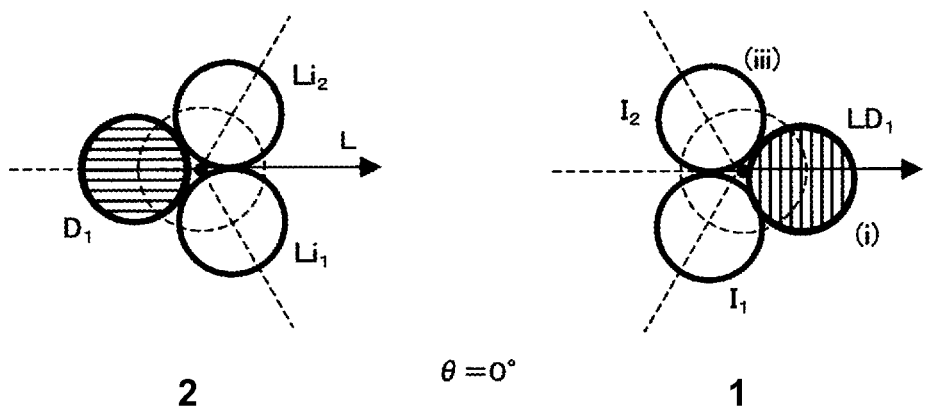
FIGS. 20(1) to 20(3) is a configuration example of a simultaneous bidirectional circuit system (one channel).
Figure 20:
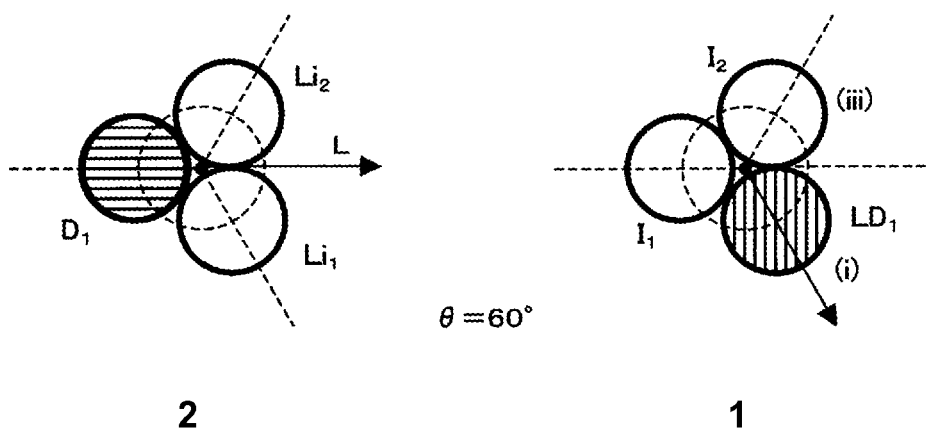
Figure 20:
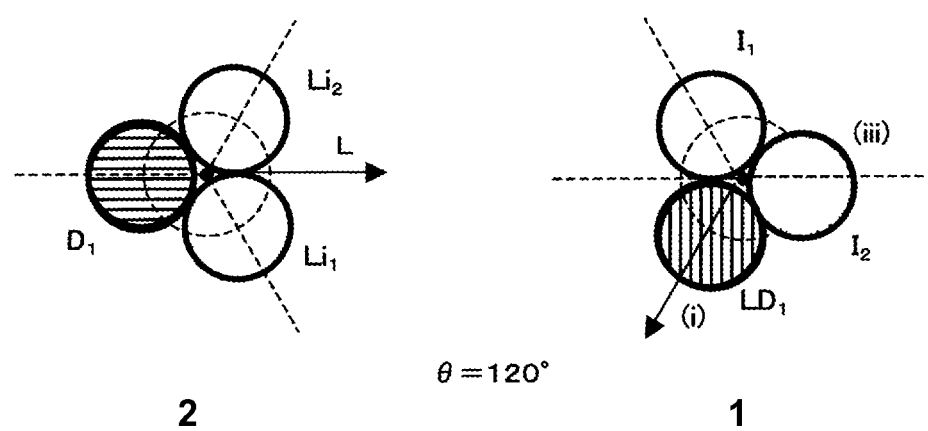

In this case, since it may have the half of the constitution of FIG. 19(1), as shown in FIGS. 20(1) to 20(3), the light output device and light-receiving device of the fixed side may be made into the structure of the one piece ($D_1$) and the two, piece ($Li_1$ and $Li_2$) respectively (the rotating side is also the same relation).

Of course, the functional switching method of the photonic device is the same method.

Next, the configuration method of the three-channel system is seen.

If the rotator side of the bidirectional two-channel system shown in FIG. 19(1) is seen as "the combination of one light output device and two light-receiving devices", $LD_1$ comprises $I_1$ and $I_2$, successively, $LD_2$ comprises $I_3$ and $I_4$ in order of CW direction.

Therefore, in the case of three channels, the group of $I_5$ and $I_6$ may be extended for $LD_3$ beside $I_4$ (since the stator side is also same situation, the description is omitted).

As mentioned above, like the case of the three abovementioned channels, regarding the multi channelization "the group of one light output device and two light-receiving devices" should be increased, the number of the groups arranged on the one circumference should be increased, and that of the counter side should be also increased.

However, when further the multi channelization is realized and the installed circle diameter becomes excessive, if the concentric circle which the multiple "groups of one light output device and the two light-receiving devices" are arranged, is multiplexed (or the multi-layering of the circle of the same diameter) and is increased, the excessiveness of the circumference length (a cylinder is longwise) is avoidable.

By this means, since it can be also structurally the possible that this non-contact connector (10) simultaneously performs the bidirectional communication, it can be said to be possible that this bidirectional circuit system is configured in this bidirectional arrangement method.

INDUSTRIAL APPLICABILITY

Since the non-contact connector concerning the present invention produces the outstanding effect like the above, it can be conveniently used for the manufacture of the various kinds of electricity, electronic equipment, etc.

DESCRIPTION OF NOTATIONS

1 . . . Rotator
2 . . . Stator
3 . . . Housing
4 . . . Rotation axis
5 . . . Rotating-side power source
7 . . . Circuit signal (or line signal)
10 . . . Non-contact connector
11 . . . Light source
13 . . . New light source
14 . . . Captured light source
21 . . . Light output device
22 . . . New light output device
31 . . . Light-receiving device
32 . . . New light-receiving device
33 . . . Rotating-side light-receiving device
50 . . . Optical coupling unit
61 . . . Communication light-receiving element
66 . . . External output terminal

The invention claimed is:

1. A non-contact connector, comprising:

a housing;

a stator fixed and stored in the housing;

a rotator contained in the housing and rotating around a rotation axis of the stator;

a light output device arranged on a vertical plane to the rotation axis of the rotator;

a light-receiving device arranged on the stator facing the light output device, and a non-contact circuiting is performed by forming a light path in a space between the light output device and the light-receiving device, wherein outputs of a light source driven with a supplied power on the rotator are emitted from the light output device in parallel with the rotation axis corresponding to the circuit signals to communicate, the light-receiving device receives the outputs, and the outputs are combined and captured by an optical coupling unit connected to the light-receiving device, a new light source is formed, the light source is composed on an external output terminal from the new light source to the non-contact circuiting, after choosing the light source before switching among the new light source, a captured light source, which secures the light source, is formed by combining the light source before switching and another light source to be switched, and the light source is restored on the external output terminal by switching between the light source before switching and the another light source to be switched.

2. The non-contact connector according to claim 1, wherein
the light-receiving devices are arranged so as to capture the light source on a circle centered on the rotation axis, and
a new light source is formed on the stator by combining output lights of the light-receiving devices with a use of optical coupling units to the non-contact circuiting.

3. The non-contact connector according to claim 1, wherein
after choosing a light source before switching among the new light source, a captured light source is formed by combining the light source before switching and a light source to be switched, and
switching of light sources between the light source before switching and a light source to be switched is performed to compose the light source on an external output terminal.

4. The non-contact connector according to claim 1, wherein
the optical coupling units and the new light-receiving devices facing a luminescence part each of the optical coupling units are arranged with an equally distance on the circumference around the rotation axis of the stator, and
a light source in a particular channel is composed by capturing a light source from the chosen new light source on the rotator side by the optical coupling units to the non-contact circuiting.

5. The non-contact connector according to claim 1, wherein
the new light source of light signals capturing the light source is composed on the stator by light-receiving elements for communication, and circuited as electric signals.

6. The non-contact connector according to claim 1, wherein
an optical system switch or an optical switch is applied to the output of the optical coupling units correspond to the N (N=integer) light-receiving devices arranged on a circumference around the rotation axis, and
the light path in a space is formed and an optical circuit system is provided.

7. The non-contact connector according to claim 1, wherein
optical circuit signals of N channels which are output from the N light-receiving devices and are input to light-receiving devices provided so as to face the light-receiving devices on the rotator are converted to electric signals, and
a circuit system with the maximum of n is formed.

8. The non-contact connector according to claim 1, wherein
after forming the new light source of the electric signals by light-receiving elements for communication from outputs of the light-receiving devices, the light source is composed on the stator and circuited as electric signals.

9. The non-contact connector according to claim 1, wherein
the light output devices and the light-receiving devices are comprised of optical semiconductor elements which have both a luminescence function and a light-receiving function, and the light output devices and the light-receiving devices are arranged to be mixed so as to capture the light source,
the light path in a space in both directions between the stator and the rotator is formed, and
a two-way communication capability and simultaneous communication performance are obtained.

\* \* \* \* \*